United States Patent
Gao et al.

(10) Patent No.: US 11,542,411 B2
(45) Date of Patent: Jan. 3, 2023

(54) METHOD FOR PREPARING COMPOSITES ON BASIS OF GRAPHENE BONDING

(71) Applicant: HANGZHOU GAOXI TECHNOLOGY CO., LTD., Hangzhou (CN)

(72) Inventors: Chao Gao, Hangzhou (CN); Zheng Li, Hangzhou (CN); Chunxiao Zhang, Hangzhou (CN); Dan Chang, Hangzhou (CN); Chen Chen, Hangzhou (CN); Weiwei Gao, Hangzhou (CN); Yan Guo, Hangzhou (CN); Yi Han, Hangzhou (CN)

(73) Assignee: HANGZHOU GAOXI TECHNOLOGY CO., LTD., Hangzhou (CN)

( * ) Notice: Subject to any disclaimer, the term of this patent is extended or adjusted under 35 U.S.C. 154(b) by 497 days.

(21) Appl. No.: 16/617,531

(22) PCT Filed: Mar. 13, 2018

(86) PCT No.: PCT/CN2018/078765
§ 371 (c)(1),
(2) Date: Jan. 16, 2020

(87) PCT Pub. No.: WO2018/219008
PCT Pub. Date: Dec. 6, 2018

(65) Prior Publication Data
US 2020/0131405 A1    Apr. 30, 2020

(30) Foreign Application Priority Data
May 27, 2017 (CN) .......................... 201710391092.4
May 27, 2017 (CN) .......................... 201710391093.9
(Continued)

(51) Int. Cl.
*C01B 32/184* (2017.01)
*C09J 1/00* (2006.01)
(Continued)

(52) U.S. Cl.
CPC ............... *C09J 1/00* (2013.01); *C01B 32/184* (2017.08); *C01B 32/194* (2017.08);
(Continued)

(58) Field of Classification Search
CPC ... C01B 32/184; C01B 32/194; C01B 32/198; C01B 2204/04; C01B 2204/24; C01P 2004/03; C01P 2004/20
See application file for complete search history.

(56) References Cited

U.S. PATENT DOCUMENTS

2013/0156678 A1*  6/2013  Banerjee ................ H01G 11/36
                                                                   204/507
2019/0292672 A1*  9/2019  Zhamu .................... C23C 18/34

FOREIGN PATENT DOCUMENTS

CN    104130719 A    11/2014
CN    104591551 A    5/2015
(Continued)

OTHER PUBLICATIONS

International Search Report issued in corresponding International application No. PCT/CN2018/078765, dated Jun. 1, 2018.

*Primary Examiner* — Richard M Rump

(57) ABSTRACT

The invention utilizes swelling and fusion effects of graphene oxide in a solvent to implement cross-linked bonding of a graphene material itself and materials such as polymers, metal, paper, glass, carbon materials, and ceramics. The present invention not only overcomes the shortcoming in traditional adhesives of residual formaldehyde, but also has short drying time, high bonding strength and high corrosion resistance. The present invention is widely applied in the
(Continued)

fields of aviation, aerospace, automobiles, machinery, construction, chemical, light industry, electronics, electrical appliances, and daily life, etc.

5 Claims, 5 Drawing Sheets

(30) Foreign Application Priority Data

| | | |
|---|---|---|
| May 27, 2017 | (CN) | 201710391843.2 |
| Aug. 14, 2017 | (CN) | 201710691600.0 |
| Nov. 18, 2017 | (CN) | 201711150763.4 |
| Nov. 18, 2017 | (CN) | 201711150773.8 |
| Nov. 18, 2017 | (CN) | 201711150776.1 |
| Nov. 18, 2017 | (CN) | 201711150778.0 |
| Nov. 18, 2017 | (CN) | 201711150786.5 |
| Nov. 18, 2017 | (CN) | 201711150791.6 |

(51) Int. Cl.
*C01B 32/194* (2017.01)
*C01B 32/198* (2017.01)
*C09J 5/06* (2006.01)
*C09J 9/00* (2006.01)
*C09K 5/14* (2006.01)

(52) U.S. Cl.
CPC ............. *C01B 32/198* (2017.08); *C09J 5/06* (2013.01); *C09J 9/00* (2013.01); *C09K 5/14* (2013.01); *C01B 2204/04* (2013.01); *C01B 2204/24* (2013.01); *C01P 2004/03* (2013.01); *C01P 2004/20* (2013.01); *C01P 2006/32* (2013.01); *C09J 2400/10* (2013.01)

(56) References Cited

FOREIGN PATENT DOCUMENTS

| | | |
|---|---|---|
| CN | 105696312 A | 6/2016 |
| CN | 106183142 A | 12/2016 |
| CN | 106948165 A | 7/2017 |

* cited by examiner

METHOD FOR PREPARING COMPOSITES ON BASIS OF GRAPHENE BONDING

TECHNICAL FIELD

The present invention relates to a method for preparing graphene-bonded composites.

BACKGROUND

With the advancement of society and the development of science and technology, people's awareness of environmental protection and sustainable development concepts become increasingly higher. The change from solvent-based adhesives to environmental-friendly water-based adhesives has become an inevitable trend in the development of adhesives. Traditional adhesives such as white latex and starch adhesives have disadvantages such as tendency to mildew, poor water and humidity resistance, and slow drying speed. Water glass has poor alkali and water resistance, is corrosive and highly irritative, and can cause human burns. Phenolic resin adhesives have the disadvantages of high brittleness and low peel strength, and are unsuitable for use as a structural adhesive. The commonly used urea-formaldehyde resin adhesives have the disadvantages of high formaldehyde release, environment pollution, and health hazards.

SUMMARY

In view of the shortcomings existing in the prior art, the swelling and fusion effect of graphene oxide in a solvent is utilized in the present invention, to achieve the cross-linking and bonding of graphene material with materials such as polymers, metals, paper, glass, carbon materials, and ceramics. The present invention not only overcomes the shortcomings of residual formaldehyde from traditional adhesives, but also has short drying time, high bonding strength, and corrosion resistance, and can find wide use in aviation, aerospace, automotive, machinery, construction, chemical engineering, light industry, electronics, electrical appliances, and daily life.

The following technical solutions are adopted in the present invention.

Solution I: In order to enable the boron nitride fibers to crosslink, graphene oxide is coated onto the surface of the boron nitride fibers in the present invention, where the graphene oxide forms a hydrogen bond and van der Waals force with boron oxide on the surface of the boron nitride fibers to achieve uniform and firm coating. Then, the graphene oxide on the surface layer of the boron nitride fibers is allowed to swell in a solvent, so the sheets get a greater degree of freedom. When dried, the graphene oxide sheets are spontaneously tightly stacked due to the capillary force caused by the solvent volatilization and the π-π force between the sheets, whereby the boron nitride fibers are cross-linked to each other, as shown in FIGS. 1, and 2. Finally, a graphene-boron nitride fiber composite material is obtained, including non-twisted yarn, non-woven fabric or chopped strand felt.

A method for producing a graphene-boron nitride fiber composite material comprises the following steps:

(1) coating the surface of boron nitride fibers with a graphene oxide dispersion, and drying to obtain boron nitride fibers coated with graphene oxide on the surface;

(2) subjecting the boron nitride fibers coated with graphene oxide to surface swelling in a solvent, and then combining and drying the fibers to form a non-twisted yarn or overlapping the fibers to each other and drying to form a non-woven fabric or chopped strand felt, where the drying temperature is below 100° C.; and (3) reducing to obtain a graphene-boron nitride fiber composite material.

Further, the concentration of the graphene oxide dispersion in Step (1) is 7 mg/g, and the dispersant is water, N,N-dimethylformamide, N,N-dimethylacetamide, ethanol, ethylene glycol, N-methylpyrrolidone, tetrahydrofuran, dimethylsulfoxide, diethylene glycol, pyridine, dioxane, methyl ethyl ketone, and isopropyl alcohol, etc.

Further, the boron nitride fibers are coated several times with the graphene oxide dispersion in Step (1), and dried after each coating; and the final graphene oxide layer has a thickness of 3 µm after drying.

Further, the solvent in Step (2) is water, an alcohol such as methanol, ethanol, isopropanol, ethylene glycol, glycerol, and diethylene glycol, an organic acid such as formic acid, acetic acid, propionic acid, butyric acid, valeric acid, oxalic acid, malonic acid, succinic acid, and acrylic acid, acetone, methyl ethyl ketone, N,N-dimethylformamide, N,N-dimethylacetamide, tetrahydrofuran, dimethylsulfoxide, N-methylpyrrolidone, pyridine, dioxane, an aqueous sodium chloride solution, an aqueous calcium chloride solution, an aqueous sodium nitrate solution, an aqueous calcium nitrate solution, an aqueous sodium phosphate solution, an aqueous potassium chloride solution, an aqueous ammonium chloride solution, an aqueous potassium hydroxide solution, an aqueous sodium hydroxide solution, or a mixture of these solutions.

Further, the reduction method in Step (3) is reduction with a chemical reducing agent such as hydroiodic acid, hydrazine hydrate, vitamin C, or sodium borohydride, or thermal reduction at 100 to 600° C.

In the prepared graphene-boron nitride fiber composite material, graphene is coated on the surface of the boron nitride fibers, and the surface of the boron nitride fibers and the graphene sheet are connected by van der Waals force and hydrogen bonding. The boron nitride fibers are cross-linked by graphene coated on the surface to form a non-twisted yarn, a non-woven fabric or a chopped strand felt. The beneficial effects are as follows:

(1) Neat graphene has uniform distribution on and high interface adhesion strength to the surface of boron nitride fibers, and does not fall off when immersed in a solvent.

(2) Neat graphene has high crosslinking strength as a crosslinking agent for boron nitride fibers. The swelling and fusion effect of graphene oxide in a solvent is utilized to achieve the cross-linking of boron nitride fibers. The method is simple, time-saving, the solvent used is environmentally friendly, and the crosslinking effect is good. The present invention has great application value compared with other crosslinking methods.

By using this crosslinking method, the excellent mechanical properties of boron nitride fibers are maintained, and the electrical and thermal conductivity of the fibers are improved, thereby further widening the application of boron nitride fiber materials.

Solution II: In order to enable the quartz fibers to crosslink, graphene oxide is coated onto the surface of the quartz fibers in the present invention, where the graphene oxide forms a hydrogen bond and van der Waals force with the hydroxyl groups of the quartz fibers to achieve uniform and firm coating. Then, the graphene oxide on the surface layer of the quartz fibers is allowed to swell in a solvent, so the sheets get a greater degree of freedom. When dried, the graphene oxide sheets are spontaneously tightly stacked due to the capillary force caused by the solvent volatilization and the π-π force between the sheets, whereby the quartz fibers are cross-linked to each other. Finally, a graphene-quartz fiber composite material is obtained. The preparation method comprises the following steps:

(1) soaking the quartz fibers in toluene, heating to 300° C. for 10 min, and drying;

(2) coating the surface of quartz fibers with a graphene oxide dispersion, and drying to obtain quartz fibers coated with graphene oxide on the surface;

(3) subjecting the quartz fibers coated with graphene oxide to surface swelling in a solvent, and then combining and drying the fibers to form a non-twisted yarn or overlapping the fibers to each other and drying to form a non-woven fabric or chopped strand felt, where the drying temperature is below 100° C.; and (4) reducing to obtain a graphene-quartz fiber composite material.

Further, the concentration of the graphene oxide dispersion in Step (2) is 7 mg/g, and the dispersant is water, N,N-dimethylformamide, N,N-dimethylacetamide, ethanol, ethylene glycol, N-methylpyrrolidone, tetrahydrofuran, dimethylsulfoxide, diethylene glycol, pyridine, dioxane, methyl ethyl ketone, and isopropyl alcohol, etc.

Further, the quartz fibers are coated several times with the graphene oxide dispersion in Step (2), and dried after each coating; and the final graphene oxide layer has a thickness of 3 μm after drying.

Further, the solvent in Step (3) is water, an alcohol such as methanol, ethanol, isopropanol, ethylene glycol, glycerol, and diethylene glycol, an organic acid such as formic acid, acetic acid, propionic acid, butyric acid, valeric acid, oxalic acid, malonic acid, succinic acid, and acrylic acid, acetone, methyl ethyl ketone, N,N-dimethylformamide, N,N-dimethylacetamide, tetrahydrofuran, dimethylsulfoxide, N-methylpyrrolidone, pyridine, dioxane, an aqueous sodium chloride solution, an aqueous calcium chloride solution, an aqueous sodium nitrate solution, an aqueous calcium nitrate solution, an aqueous sodium phosphate solution, an aqueous potassium chloride solution, an aqueous ammonium chloride solution, an aqueous potassium hydroxide solution, an aqueous sodium hydroxide solution, or a mixture of these solutions.

Further, the reduction method in Step (4) is reduction with a chemical reducing agent such as hydroiodic acid, hydrazine hydrate, vitamin C, or sodium borohydride, or thermal reduction at 100 to 600° C.

In the prepared graphene-quartz fiber composite material, graphene is coated on the surface of the quartz fibers, and the surface of the quartz fibers and the graphene sheet are connected by van der Waals force and hydrogen bonding. The quartz fibers are cross-linked by graphene coated on the surface to form a non-twisted yarn, a non-woven fabric or a chopped strand felt. The beneficial effects are as follows:

(1) Neat graphene has uniform distribution on and high interface adhesion strength to the surface of quartz fibers, and does not fall off when immersed in a solvent.

(2) Neat graphene has high crosslinking strength as a crosslinking agent for quartz fibers. The swelling and fusion of graphene oxide in a solvent is utilized to achieve the cross-linking of quartz fibers. The method is simple, time-saving, the solvent used is environmentally friendly, and the crosslinking effect is good. The present invention has great application value compared with other crosslinking methods.

By using this crosslinking method, the excellent mechanical properties of quartz fibers are maintained, and the electrical and thermal conductivity and alkali resistance of the quartz fibers are improved, thereby further widening the application of quartz fiber materials.

Solution III: In order to enable the silicon carbide fibers to crosslink, graphene oxide is coated onto the surface of the silicon carbide fibers in the present invention, where the graphene oxide forms van der Waals force with the surface of the silicon carbide to achieve uniform and firm coating. Then, the graphene oxide on the surface layer of the silicon carbide fibers is allowed to swell in a solvent, so the sheets get a greater degree of freedom. When dried, the graphene oxide sheets are spontaneously tightly stacked due to the capillary force caused by the solvent volatilization and the π-π force between the sheets, whereby the silicon carbide fibers are cross-linked to each other. Finally, a graphene-silicon carbide fiber composite material is obtained. The preparation method comprises the following steps:

(1) coating the surface of silicon carbide fibers with a graphene oxide dispersion, and drying to obtain silicon carbide fibers coated with graphene oxide on the surface;

(2) subjecting the silicon carbide fibers coated with graphene oxide to surface swelling in a solvent, and then combining and drying the fibers to form a non-twisted yarn or overlapping the fibers to each other and drying to form a non-woven fabric or chopped strand felt, where the drying temperature is below 100° C.; and (3) reducing to obtain a graphene-silicon carbide fiber composite material.

Further, the silicon carbide fiber in Step (1) contains one or more of titanium, iron, nickel, boron, aluminum, and zirconium elements, and the fiber is of a round shape, a trilobal shape, a swirl shape, a hexaphyllous shape, a strip shape, a cross shape, and a hollow shape at the cross section.

Further, the concentration of the graphene oxide dispersion in Step (1) is 7 mg/g, and the dispersant is water, N,N-dimethylformamide, N,N-dimethylacetamide, ethanol, ethylene glycol, N-methylpyrrolidone, tetrahydrofuran, dimethylsulfoxide, diethylene glycol, pyridine, dioxane, methyl ethyl ketone, and isopropyl alcohol, etc.

Further, the silicon carbide fibers are coated several times with the graphene oxide dispersion in Step (1), and dried after each coating, and the final graphene oxide layer has a thickness of 3 μm after drying.

Further, the solvent in Step (2) is water, an alcohol such as methanol, ethanol, isopropanol, ethylene glycol, glycerol, and diethylene glycol, an organic acid such as formic acid, acetic acid, propionic acid, butyric acid, valeric acid, oxalic acid, malonic acid, succinic acid, and acrylic acid, acetone, methyl ethyl ketone, N,N-dimethylformamide, N,N-dimethylacetamide, tetrahydrofuran, dimethylsulfoxide, N-methylpyrrolidone, pyridine, dioxane, an aqueous sodium chloride solution, an aqueous calcium chloride solution, an aqueous sodium nitrate solution, an aqueous calcium nitrate solution, an aqueous sodium phosphate solution, an aqueous potassium chloride solution, an aqueous ammonium chloride solution, an aqueous potassium hydroxide solution, an aqueous sodium hydroxide solution, or a mixture of these solutions.

Further, the reduction method in Step (3) is reduction with a chemical reducing agent such as hydroiodic acid, hydrazine hydrate, vitamin C, or sodium borohydride, or thermal reduction at 100 to 600° C.

In the prepared graphene-silicon carbide fiber composite material, graphene is coated on the surface of the silicon carbide fibers, and the surface of the silicon carbide fibers and the graphene sheet are connected by van der Waals force. The silicon carbide fibers are cross-linked by graphene coated on the surface to form a non-twisted yarn, a non-woven fabric or a chopped strand felt. The beneficial effects are as follows:

(1) Neat graphene has uniform distribution on and high interface adhesion strength to the surface of silicon carbide fibers, and does not fall off when immersed in a solvent.

(2) Neat graphene has high crosslinking strength as a crosslinking agent for silicon carbide fibers. The swelling and fusion of graphene oxide in a solvent is utilized to achieve the cross-linking of silicon carbide fibers. The method is simple, time-saving, the solvent used is environmentally friendly, and the crosslinking effect is good. The present invention has great application value compared with other crosslinking methods.

By using this crosslinking method, the excellent mechanical properties of silicon carbide fibers are maintained, and the electrical and thermal conductivity of the fibers are improved, thereby further widening the application of silicon carbide fiber materials. In addition, because graphene itself has adjustable electrical conductivity, after graphene is compounded with silicon carbide fibers, the overall dielectric properties of the system can be adjusted, and the ability to absorb and reflect electromagnetic waves are effectively improved, so the resulting material finds wide use in absorbing materials and electromagnetic shielding materials.

Solution IV: In order to enable the basalt fibers to crosslink, graphene oxide is coated onto the surface of the basalt fibers in the present invention, where the graphene oxide forms a hydrogen bond and van der Waals force with the hydroxyl groups of the basalt fibers to achieve uniform and firm coating. Then, the graphene oxide on the surface layer of the basalt fibers is allowed to swell in a solvent, so the sheets get a greater degree of freedom. When dried, the graphene oxide sheets are spontaneously tightly stacked due to the capillary force caused by the solvent volatilization and the π-π force between the sheets, whereby the basalt fibers are cross-linked to each other. Finally, a graphene-basalt fiber composite material is obtained. The preparation method comprises the following steps:

(1) heating the basalt fibers in toluene at 250° C., ultrasonically washing for 10-30 min to remove the sizing agent and oil on the surface, and drying;

(2) coating the surface of basalt fibers with a graphene oxide dispersion, and drying to obtain basalt fibers coated with graphene oxide on the surface;

(3) subjecting the basalt fibers coated with graphene oxide to surface swelling in a solvent, and then combining and drying the fibers to form a non-twisted yarn or overlapping the fibers to each other and drying to form a non-woven fabric or chopped strand felt, where the drying temperature is below 100° C.; and (4) reducing to obtain a graphene-basalt fiber composite material.

Further, the concentration of the graphene oxide dispersion in Step (2) is 7 mg/g, and the dispersant is water, N,N-dimethylformamide, N,N-dimethylacetamide, ethanol, ethylene glycol, N-methylpyrrolidone, tetrahydrofuran, dimethylsulfoxide, diethylene glycol, pyridine, dioxane, methyl ethyl ketone, and isopropyl alcohol, etc.

Further, the basalt fibers are coated several times with the graphene oxide dispersion in Step (2), and dried after each coating; and the final graphene oxide layer has a thickness of 3 μm after drying.

Further, the solvent in Step (3) is water, an alcohol such as methanol, ethanol, isopropanol, ethylene glycol, glycerol, and diethylene glycol, an organic acid such as formic acid, acetic acid, propionic acid, butyric acid, valeric acid, oxalic acid, malonic acid, succinic acid, and acrylic acid, acetone, methyl ethyl ketone, N,N-dimethylformamide, N,N-dimethylacetamide, tetrahydrofuran, dimethylsulfoxide, N-methylpyrrolidone, pyridine, dioxane, an aqueous sodium chloride solution, an aqueous calcium chloride solution, an aqueous sodium nitrate solution, an aqueous calcium nitrate solution, an aqueous sodium phosphate solution, an aqueous potassium chloride solution, an aqueous ammonium chloride solution, an aqueous potassium hydroxide solution, an aqueous sodium hydroxide solution, or a mixture of these solutions.

Further, the reduction method in Step (4) is reduction with a chemical reducing agent such as hydroiodic acid, hydrazine hydrate, vitamin C, or sodium borohydride, or thermal reduction at 100 to 600° C.

The present invention has the following beneficial effects.

(1) Neat graphene has uniform distribution on and high interface adhesion strength to the surface of basalt fibers, and does not fall off when immersed in a solvent.

(2) Neat graphene has high crosslinking strength as a crosslinking agent for basalt fibers. The swelling and fusion of graphene oxide in a solvent is utilized to achieve the cross-linking of basalt fibers. The method is simple, time-saving, the solvent used is environmentally friendly, and the crosslinking effect is good. The present invention has great application value compared with other crosslinking methods.

By using this crosslinking method, the excellent mechanical properties of basalt fibers are maintained, and the electrical and thermal conductivity and alkali resistance are improved, thereby further widening the application of basalt fiber materials.

In the prepared graphene-basalt fiber composite material, graphene is coated on the surface of the basalt fibers, and the surface of the basalt fibers and the graphene sheet are connected by van der Waals force and hydrogen bonding. The basalt fibers are cross-linked by graphene coated on the surface to form a non-twisted yarn, a non-woven fabric or a chopped strand felt. The beneficial effects are as follows:

(1) Neat graphene has uniform distribution on and high interface adhesion strength to the surface of basalt fibers, and does not fall off when immersed in a solvent.

(2) Neat graphene has high crosslinking strength as a crosslinking agent for basalt fibers. The swelling and fusion of graphene oxide in a solvent is utilized to achieve the cross-linking of basalt fibers. The method is simple, time-saving, the solvent used is environmentally friendly, and the crosslinking effect is good. The present invention has great application value compared with other crosslinking methods.

By using this crosslinking method, the excellent mechanical properties of basalt fibers are maintained, and the electrical and thermal conductivity and alkali resistance are improved, thereby further widening the application of basalt fiber materials.

Solution V: In order to enable the alumina fibers to crosslink, graphene oxide is coated onto the surface of the alumina fibers in the present invention, where the graphene oxide forms a hydrogen bond and van der Waals force with the hydroxyl groups of the alumina fibers to achieve uniform and firm coating. Then, the graphene oxide on the surface layer of the alumina fibers is allowed to swell in a solvent, so the sheets get a greater degree of freedom. When dried, the graphene oxide sheets are spontaneously tightly stacked due to the capillary force caused by the solvent volatilization and the π-π force between the sheets, whereby the alumina fibers are cross-linked to each other. Finally, a graphene-alumina fiber composite material is obtained. The preparation method comprises the following steps:

(1) coating the surface of alumina fibers with a graphene oxide dispersion, and drying to obtain alumina fibers coated with graphene oxide on the surface;

(2) subjecting the alumina fibers coated with graphene oxide to surface swelling in a solvent, and then combining and drying the fibers to form a non-twisted yarn or overlapping the fibers to each other and drying to form a non-woven fabric or chopped strand felt, where the drying temperature is below 100° C.; and (3) reducing to obtain a graphene-alumina fiber composite material.

Further, the concentration of the graphene oxide dispersion in Step (1) is 7 mg/g, and the dispersant is water, N,N-dimethylformamide, N,N-dimethylacetamide, ethanol, ethylene glycol, N-methylpyrrolidone, tetrahydrofuran, dimethylsulfoxide, diethylene glycol, pyridine, dioxane, methyl ethyl ketone, and isopropyl alcohol, etc.

Further, the alumina fibers are coated several times with the graphene oxide dispersion in Step (1), and dried after each coating; and the final graphene oxide layer has a thickness of 3 μm after drying.

Further, the solvent in Step (2) is water, an alcohol such as methanol, ethanol, isopropanol, ethylene glycol, glycerol, and diethylene glycol, an organic acid such as formic acid, acetic acid, propionic acid, butyric acid, valeric acid, oxalic acid, malonic acid, succinic acid, and acrylic acid, acetone, methyl ethyl ketone, N,N-dimethylformamide, N,N-dimethylacetamide, tetrahydrofuran, dimethylsulfoxide, N-methylpyrrolidone, pyridine, dioxane, an aqueous sodium chloride solution, an aqueous calcium chloride solution, an aqueous sodium nitrate solution, an aqueous calcium nitrate solution, an aqueous sodium phosphate solution, an aqueous potassium chloride solution, an aqueous ammonium chloride solution, an aqueous potassium hydroxide solution, an aqueous sodium hydroxide solution, or a mixture of these solutions.

Further, the reduction method in Step (3) is reduction with a chemical reducing agent such as hydroiodic acid, hydrazine hydrate, vitamin C, or sodium borohydride, or thermal reduction at 100 to 600° C.

In the prepared graphene-alumina fiber composite material, graphene is coated on the surface of the alumina fibers, and the surface of the alumina fibers and the graphene sheet are connected by van der Waals force and hydrogen bonding. The alumina fibers are cross-linked by graphene coated on the surface to form a non-twisted yarn, a non-woven fabric or a chopped strand felt. The beneficial effects are as follows:

(1) Neat graphene has uniform distribution on and high interface adhesion strength to the surface of alumina fibers, and does not fall off when immersed in a solvent.

(2) Neat graphene has high crosslinking strength as a crosslinking agent for alumina fibers. The swelling and fusion of graphene oxide in a solvent is utilized to achieve the cross-linking of alumina fibers. The method is simple, time-saving, the solvent used is environmentally friendly, and the crosslinking effect is good. The present invention has great application value compared with other crosslinking methods.

By using this crosslinking method, the excellent mechanical properties of alumina fibers are maintained, and the electrical and thermal conductivity of the fibers are improved, thereby further widening the application of alumina fiber materials.

Solution VI: In order to enable the glass fibers to cross-link, graphene oxide is coated onto the surface of the glass fibers in the present invention, where the graphene oxide forms a hydrogen bond and van der Waals force with the hydroxyl groups of the glass fibers to achieve uniform and firm coating. Then, the graphene oxide on the surface layer of the glass fibers is allowed to swell in a solvent, so the sheets get a greater degree of freedom. When dried, the graphene oxide sheets are spontaneously tightly stacked due to the capillary force caused by the solvent volatilization and the π-π force between the sheets, whereby the glass fibers are cross-linked to each other. Finally, a graphene-glass fiber composite material is obtained. The preparation method comprises the following steps:

(1) ultrasonically washing the glass fiber in acetone to remove the oil on the surface, and drying;

(2) coating the surface of glass fibers with a graphene oxide dispersion, and drying to obtain glass fibers coated with graphene oxide on the surface;

(3) subjecting the glass fibers coated with graphene oxide to surface swelling in a solvent, and then combining and drying the fibers to form a non-twisted yarn or overlapping the fibers to each other and drying to form a non-woven fabric or chopped strand felt, where the drying temperature is below 100° C.; and (4) reducing to obtain a graphene-glass fiber composite material.

Further, the concentration of the graphene oxide dispersion in Step (2) is 7 mg/g, and the dispersant is water, N,N-dimethylformamide, N,N-dimethylacetamide, ethanol, ethylene glycol, N-methylpyrrolidone, tetrahydrofuran, dimethylsulfoxide, diethylene glycol, pyridine, dioxane, methyl ethyl ketone, and isopropyl alcohol, etc.

Further, the glass fibers are coated several times with the graphene oxide dispersion in Step (2), and dried after each coating; and the final graphene oxide layer has a thickness of 3 μm after drying.

Further, the solvent in Step (3) is water, an alcohol such as methanol, ethanol, isopropanol, ethylene glycol, glycerol, and diethylene glycol, an organic acid such as formic acid, acetic acid, propionic acid, butyric acid, valeric acid, oxalic acid, malonic acid, succinic acid, and acrylic acid, acetone, methyl ethyl ketone, N,N-dimethylformamide, N,N-dimethylacetamide, tetrahydrofuran, dimethylsulfoxide, N-methylpyrrolidone, pyridine, dioxane, an aqueous sodium chloride solution, an aqueous calcium chloride solution, an aqueous sodium nitrate solution, an aqueous calcium nitrate solution, an aqueous sodium phosphate solution, an aqueous potassium chloride solution, an aqueous ammonium chloride solution, an aqueous potassium hydroxide solution, an aqueous sodium hydroxide solution, or a mixture of these solutions.

Further, the reduction method in Step (4) is reduction with a chemical reducing agent such as hydroiodic acid, hydrazine hydrate, vitamin C, or sodium borohydride, or thermal reduction at 100 to 600° C.

In the prepared graphene-glass fiber composite material, graphene is coated on the surface of the glass fibers, and the surface of the glass fibers and the graphene sheet are connected by van der Waals force and hydrogen bonding. The glass fibers are cross-linked by graphene coated on the surface to form a non-twisted yarn, a non-woven fabric or a chopped strand felt. The beneficial effects are as follows:

(1) Neat graphene has uniform distribution on and high interface adhesion strength to the surface of glass fibers, and does not fall off when immersed in a solvent.

(2) Neat graphene has high crosslinking strength as a crosslinking agent for glass fibers. The swelling and fusion of graphene oxide in a solvent is utilized to achieve the cross-linking of glass fibers. The method is simple, time-saving, the solvent used is environmentally friendly, and the crosslinking effect is good. The present invention has great application value compared with other crosslinking methods.

By using this crosslinking method, the excellent mechanical properties of glass fibers are maintained, and the electrical and thermal conductivity and corrosion resistance of the glass fibers are improved, thereby further widening the application of glass fiber materials.

Solution VII: In order to enable the carbon fibers to crosslink, graphene oxide as a sizing agent is coated onto individual carbon fibers in the present invention, where the graphene oxide is attached to the fiber surface along the axis of the fibers under the action of van der Waals force and hydrogen bonding, that is, the graphene oxide is distributed along the axis of the fibers, as shown in FIG. 3b. Then, the graphene oxide on the surface layer of the carbon fibers is allowed to swell in a solvent, so the sheets get a greater degree of freedom. When dried, the graphene oxide sheets are spontaneously tightly stacked due to the capillary force caused by the solvent volatilization and the $\pi$-$\pi$ force between the sheets, whereby the carbon fibers are cross-linked to each other, as shown in FIG. 3c. Finally, a carbon fiber tow crosslinked with graphene is obtained. The preparation method comprises the following steps:

(1) removing the sizing agent on the surface of carbon fibers, and modifying the surface by oxidation;

(2) coating the surface of the modified carbon fibers with a graphene oxide dispersion, and drying to obtain carbon fibers coated with graphene oxide on the surface;

(3) subjecting a plurality of carbon fibers coated with graphene oxide to surface swelling in a solvent, then bundling the swollen fibers into a tow, and drying at a temperature lower than 100° C. to volatilize the solvent;

(4) reducing to obtain a carbon fiber tow crosslinked with graphene.

The carbon fibers have graphene sheets distributed along the axis of the fibers on the surface, where the surface of the carbon fibers and the graphene sheet are connected by Van der Waals force and hydrogen bonding. At the nodes of the fabric, the carbon fibers are crosslinked by the graphene sheets.

A method for preparing a carbon fiber fabric crosslinked with graphene comprises the following steps:

(1) removing the sizing agent on the surface of carbon fibers, and modifying the surface by oxidation;

(2) coating the surface of the modified carbon fibers with a graphene oxide dispersion, and drying to obtain carbon fibers coated with graphene oxide on the surface;

(3) weaving a plurality of carbon fibers coated with graphene oxide into a fabric, subjecting the fabric to surface swelling in a solvent, fusing, and drying at a temperature lower than 100° C. to volatilize the solvent; and (4) reducing to obtain a carbon fiber fabric crosslinked with graphene.

Further, the method for removing the sizing agent on the surface of the carbon fibers in Step (1) comprises placing the carbon fibers in acetone at reflux at 57 to 100° C. for more than 6 hrs, and drying. The method for modifying the surface of the carbon fibers by oxidation in Step (1) comprises immersing the carbon fibers in a hydrogen peroxide solution (30 wt %) at 100 to 157° C. for 0.5 to 3 hrs, and then in concentrated nitric acid (70 wt %) at 83 to 120° C. for 6-24 hrs, washing with water and drying. Preferably, the carbon fibers are refluxed in acetone at 80° C. for 72 hrs to remove the sizing agent on the surface. Then the fibers are immersed in hydrogen peroxide at 110° C. for 2 hrs and then in concentrated nitric acid at 115° C. for 12 hrs, and finally washed with water and dried.

Further, in the graphene oxide dispersion in Step (2), the dispersant is water, N,N-dimethylformamide, N,N-dimethylacetamide, ethanol, ethylene glycol, N-methylpyrrolidone, tetrahydrofuran, dimethylsulfoxide, diethylene glycol, pyridine, dioxane, methyl ethyl ketone, and isopropyl alcohol, etc.

Further, the carbon fibers modified by oxidation are coated several times with the graphene oxide dispersion in Step (2), and dried after each coating at a temperature of about 25-50° C.

Further, the solvent in Step (3) is water, an alcohol such as methanol, ethanol, isopropanol, ethylene glycol, glycerol, and diethylene glycol, an organic acid such as formic acid, acetic acid, propionic acid, butyric acid, valeric acid, oxalic acid, malonic acid, succinic acid, and acrylic acid, acetone, methyl ethyl ketone, N,N-dimethylformamide, N,N-dimethylacetamide, tetrahydrofuran, dimethylsulfoxide, N-methylpyrrolidone, pyridine, dioxane, an aqueous sodium chloride solution, an aqueous calcium chloride solution, an aqueous sodium nitrate solution, an aqueous calcium nitrate solution, an aqueous sodium phosphate solution, an aqueous potassium chloride solution, an aqueous ammonium chloride solution, an aqueous potassium hydroxide solution, an aqueous sodium hydroxide solution, or a mixture of these solutions.

Further, the reduction method in Step (4) is reduction with a chemical reducing agent such as hydroiodic acid, hydrazine hydrate, vitamin C, or sodium borohydride, or thermal reduction at 100 to 3000° C.

Further, the concentration of the graphene oxide dispersion in Step 2 is 7 mg/ml, and the thickness of the graphene oxide on the surface of the carbon fiber is 3 μm after drying.

The carbon fibers in the prepared carbon fiber tow are crosslinked by graphene sheets distributed along the axis of the fibers. The surface of the carbon fibers and the graphene sheet are connected by van der Waals force and hydrogen bonding. In the obtained carbon fiber fabric, the carbon fibers have graphene sheets distributed along the axis of the fibers on the surface, where the surface of the carbon fibers and the graphene sheet are connected by Van der Waals force and hydrogen bonding. At the nodes of the fabric, the carbon fibers are crosslinked by the graphene sheets. Compared with the prior art, the present invention has the following advantages.

(1) Neat graphene, as a sizing agent on fibers, has uniform distribution on and high interface adhesion strength to the surface of fibers, and does not fall off when immersed in a solvent.

(2) Neat graphene has high crosslinking strength as a crosslinking agent for carbon fibers. The swelling and fusion of graphene oxide in a solvent is utilized to achieve the cross-linking of carbon fibers. The method is simple, time-saving, the solvent used is environmentally friendly, and the crosslinking effect is good. This crosslinking method is of great application value.

By using this crosslinking method, the excellent mechanical properties, electrical conductivity, and corrosion resistance of carbon fibers are maintained, and the thermal conductivity of the carbon fibers are improved, thereby further widening the application of carbon fiber materials.

Solution VIII: In order to effect the bonding of the graphene oxide film, in the present invention, a layer of water or dilute graphene oxide solution is evenly sprayed on the surface of the graphene oxide film, and after the surface swells, a plurality of graphene oxide films are bonded together, where the graphene oxide films are self-bonded at the interface for bonding of the films by hydrogen bonding and van der Waals forces. Therefore, the graphene oxide film is fused into one piece, and the interface between the films almost disappears. Through further low-temperature hot pressing and high-temperature hot pressing, annealing and reduction, the graphene film has few pleats and almost all the defects on the graphene sheet are repaired, to form a perfect three-dimensional graphite structure. There is a certain fusion between the graphene sheets in contact with each other, and finally a thick thermally conductive graphene film with a thickness greater than 50 μm is obtained. The preparation method comprises the following steps:

(1) formulating graphene oxide having an average size greater than 50 μm into an aqueous graphene oxide solution having a concentration of 1 to 20 mg/mL, and naturally drying after a film is formed from the solution, to obtain a graphene oxide film.

(2) laminating a plurality of graphene oxide films specifically by uniformly spraying a liquid on the surface of the graphene oxide film to swell the surface, and then bonding the plurality of graphene oxide films together in the thickness direction:

(3) drying the bonded graphene oxide composite film in an oven at a temperature of lower than 40° C.;

(4) transferring the dried graphene oxide composite film to a hot-pressing chamber of a hot press, heating to 200° C. at a ramping rate of 0.1 to 5° C./min, then hot pressing by repeating the following hot pressing process 8-10 times: maintaining the pressure at 20 MPa for 1 hr, gradually releasing the pressure to 0 MPa, and evacuating the hot-pressing chamber for 5 min to a vacuum level of −100-10 KPa; then heating to 300° C. for 0.5 hr at a ramping rate of 0.1-5° C./min, and then hot pressing by repeating the following hot pressing process 4-6 times: maintaining the pressure at 60 MPa for 1 hr, gradually releasing the pressure to 0 MPa, and evacuating the hot-pressing chamber for 5 min to a vacuum level of −100-10 KPa; and naturally cooling after hot pressing; and (5) heating the graphene oxide film that is hot pressed in Step 4 to a temperature of 1800-3000° C. at a ramping rate of 1-20° C./min under an inert gas atmosphere and further hot pressed, where the temperature and pressure are held for 0.5-8 hrs; and the pressure is 60 MPa. After cooling, a thick graphene film with high thermal conductivity is obtained.

Further, the thickness of the graphene oxide film prepared in Step 1 is 1-30 μm.

Further, the film forming method in Step 1 is selected from suction filtration, blade coating, spin coating, spray coating, and dip coating.

Further, the carbon/oxygen ratio in the graphene oxide film prepared in Step 1 is 1.8 to 2.1.

Further, the liquid for spraying in Step 2 is deionized water, a graphene oxide aqueous solution having a concentration of 1 to 10 mg/mL, or other solutions containing deionized water.

The thickness of the prepared thick graphene film is greater than 50 μm, and the porosity is 5 to 40%. The pleat density on the graphene sheet is controlled at 50-500 mm/mm$^2$, and the graphene sheet has few defects, and has a ID/TG ratio of <0.02, and an in-plane thermal conductivity of 1000 to 2000 W/mK. There is no delamination in the thick graphene film, and the distance between any two adjacent graphene sheets is less than 20 nm. The beneficial effects are as follows. In the present invention, a plurality of graphene oxide films are bonded together after the surface of the graphene oxide films is swelled. After drying, the graphene oxide films are self-bonded by the force at the bonding interface, and further ho-temperature hot pressing makes the adhesion between graphene oxide films more strong, thereby realizing the preparation of thick graphene oxide films. Finally, by pre-reduction by heating at a low temperature and hot pressing at a high temperature, the defects in the graphene film structure are repaired, the pleat density on the graphene sheet is controlled, and the degree of orientation of the graphene sheet is increased, whereby the graphene film is allowed to form a three-dimensional graphite structure to the highest degree, and the graphene is ensured to have a smooth thermal conduction path. Therefore, a thick graphene film with high thermal conductivity is obtained. This highly thermally conductive thick graphene film is flexible, bendable, and highly thermally conductive.

Solution IX: A graphene oxide adhesive comprises a solvent and graphene oxide dispersed in the solvent. The concentration of the graphene oxide is 4 mg/ml or higher, the C/O ratio is 3:1 or less, and the proportion of single-layer graphene oxide is greater than 80%. The size of the graphene oxide sheet is 1 to 100 μm, where the amount of graphene oxide sheets with a size of less than 5 μm is not more than 10%, and the amount of graphene oxide sheets with a size of greater than 30 μm is not less than 60%.

Further, the solvent is water, or DMF.

A method of bonding based on a graphene material comprises hydrophilically treating the surface of to-be-bonded materials, then uniformly coating a graphene oxide adhesive between a plurality of to-be-bonded materials, and drying to bond the to-be-bonded materials by graphene oxide.

Further, the to-be-bonded materials comprise materials such as polymers, metals, paper, glass, carbon materials, and ceramics, and combinations of the above-mentioned different materials.

The invention initially proposes a new environmentally friendly graphene oxide adhesive, which not only overcomes the shortcomings of residual formaldehyde from traditional adhesives, but also has good bonding properties, and can find wide use in aviation, aerospace, automotive, machinery, construction, chemical engineering, light industry, electronics, electrical appliances, and daily life. Compared with the prior art, the present invention has the following beneficial effects:

(1) In the process of synthesizing the graphene oxide adhesive, no polymer-containing materials are added, so there is no pollution, and the process is environmentally friendly.

(2) The graphene oxide adhesive is used for bonding by coating directly and drying. It is convenient in use and can effect continuous production.

(3) The bonded interface is stable and can withstand high temperature, acid and alkali corrosion.

Solution X: A method for bonding with graphene comprises uniformly coating a graphene oxide solution between a plurality of materials to be bonded, drying, and reducing, to bond the materials to be bonded by graphene. In the graphene oxide solution, the size of the graphene oxide sheet is 1 to 100 μm, where the amount of graphene oxide sheets with a size of less than 5 μm is not more than 10%/o, and the amount of graphene oxide sheets with a size of greater than 30 μm is not less than 65%; the proportion of single-layer graphene oxide is greater than 80%; and the concentration of graphene oxide is 4 mg/mL or higher.

Further, the C/O in the graphene after reduction is greater than 4:1.

Further, the solvent is water, ethanol, or N,N-dimethyl-formamide (DMF).

Further, the to-be-bonded materials comprise materials such as polymers, metals, paper, glass, carbon materials, and ceramics, and combinations of the above-mentioned different materials.

Further, the reduction method is chemical reduction with hydroiodic acid or hydrazine hydrate vapor at 80-100° C.

Further, the reduction method is thermal reduction by slowly heating up to 100-500° C. at a ramping rate of 1° C./min in a pressurized or vacuum state.

The present invention initially proposes a method for achieving bonding with 100% graphene at the interface of materials. In this strategy, effective bonding at the interface of materials is established with highly polar graphene oxide, then a controlled reduction is carried out to obtain a graphene adhesive layer, where the occurrence of debonding and bubbling during reduction are effectively avoided. Compared with the prior art, the present invention has the following beneficial effects:

(1) During the bonding process, no polymer-containing materials are added, so there is no pollution, and the process is environmentally friendly.

(2) The method of use is simple, and characteristics such as electrical conductivity and thermal conductivity are exhibited at the bonding site.

(3) The bonding interface is stable and can withstand high temperature, humidity, acid and alkali corrosion, etc.

DESCRIPTION OF THE EMBODIMENTS

The present invention will be specifically described by the following examples, which are only used to further illustrate the present invention, and are not to be construed as limiting the scope of the present invention. Some non-essential changes and adjustments made by those skilled in the art according to the disclosure the present invention are contemplated in the scope of protection of the present invention.

Unless otherwise specifically indicated, the percentages in the following examples are quantitative percentages. For example, "single-layer graphene oxide accounts for 81.5% of the total amount of graphene oxide" means that out of 1000 sheets of graphene oxide, the number of single-layer graphene oxide is 815 sheets; "the amount of graphene oxide sheets with a size of less than 5 μm is 7±3% sheets" means that the number of graphene oxide sheets with a size of less than 5 μm is 7±3 out of 100 sheets of graphene oxide. In addition, C/O is a commonly used technical term in the art, and represents the ratio of the number of atoms of C and O.

Example 1-1

In this example, the bonding properties of graphene oxide adhesives at various concentrations are studied under the conditions that follow.

In the graphene oxide solution used, the amount of graphene oxide sheets with a size of less than 5 μm is 7±3%, the amount of graphene oxide sheets with a size of greater than 30 μm is 65±4%, and the rest has a size between 5-30 μm; and the overall C/O ratio is 2.5:1, and single-layer graphene oxide accounts for 81.5% of the total amount of graphene oxide.

Aqueous graphene oxide solutions having a concentration of 2-20 mg/ml are formulated, and two glass slides are bonded therewith through a method comprising hydrophilically treating the glass slides, then coating the graphene oxide adhesive evenly between the two slides, and drying. As a result, the two slides are bonded by graphene oxide.

Figure 1:
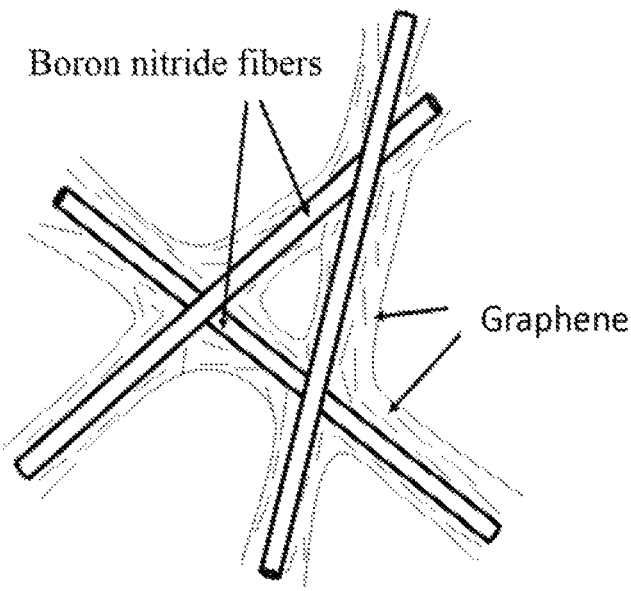
FIG. 1 is a schematic diagram of a non-woven fabric of boron nitride fibers crosslinked with the graphene of the present invention.
Figure 2:
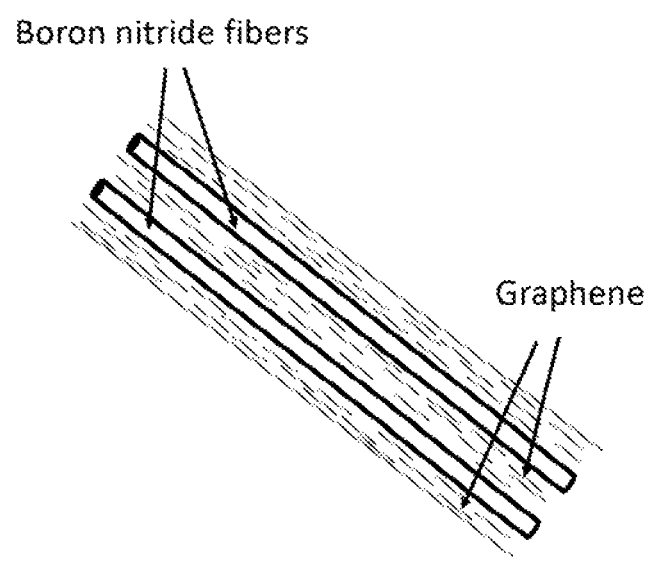
FIG. 2 is a schematic diagram of a non-twisted yarn of boron nitride fibers crosslinked with the graphene of the present invention.
Figure 3:
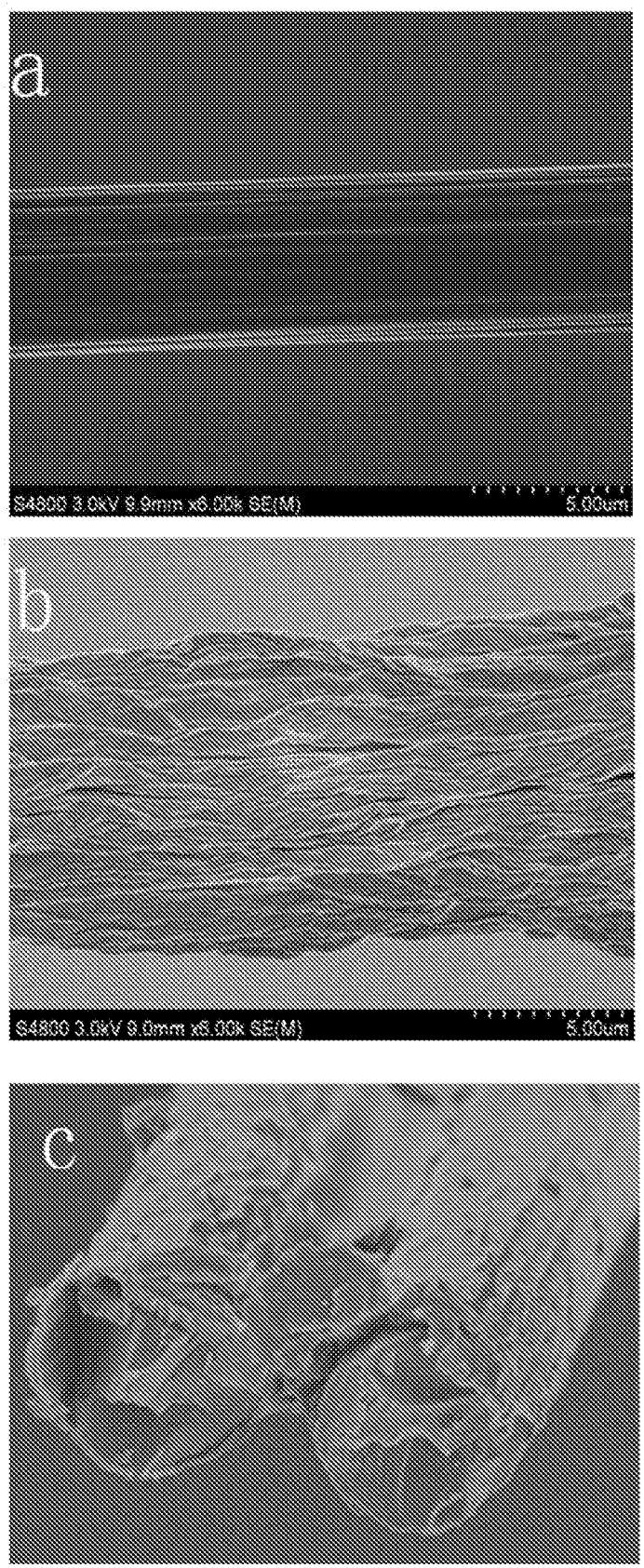
FIGS. 3a and 3b are SEM images of an individual carbon fiber before and after coating, respectively.
FIG. 3c is a cross-sectional view of two crosslinked carbon fibers.
Figure 4:
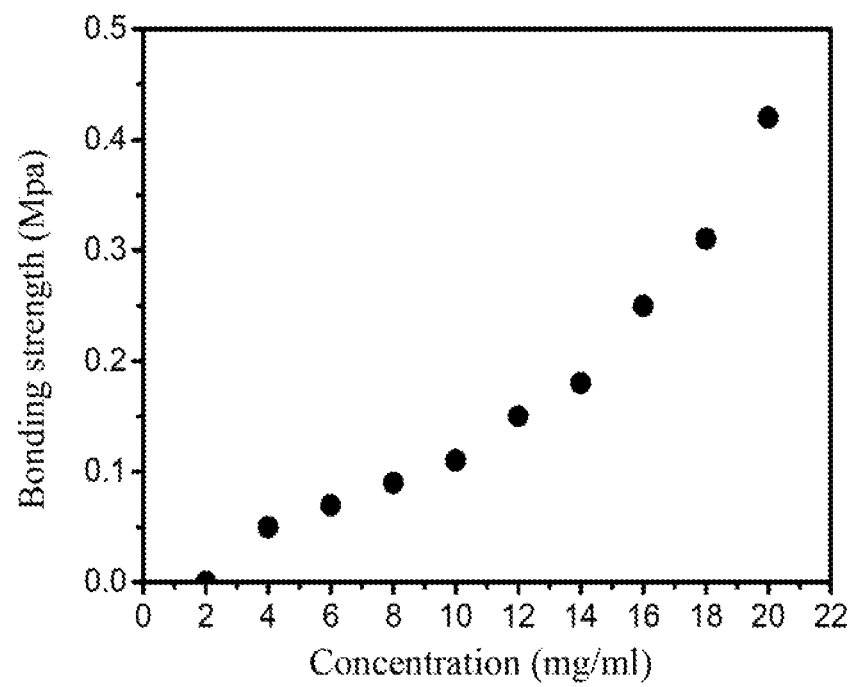
FIG. 4 is a graph showing the bonding performance of various concentrations of adhesives (graphene oxide).

The bonding effect at various concentrations is shown in FIG. 4. It can be seen from the figure that a good bonding effect is exhibited when the concentration of graphene oxide is more than 4 mg/ml.

Example 1-2

In this example, the bonding properties of graphene oxide adhesives with various C/O ratios (1:3, 1:2, 1:1, 2:1, 3:1, 4:1, 5:1) are studied under the conditions that follow.

In the graphene oxide used, the amount of graphene oxide sheets with a size of less than 5 μm is 5±3%, the amount of graphene oxide sheets with a size of greater than 30 μm is 60±5%, and the rest has a size between 5-30 μm; and single-layer graphene oxide accounts for 95.8% of the total amount of graphene oxide. An aqueous graphene oxide solution having a concentration of 8 mg/ml is formulated, and two glass slides are bonded therewith through a method comprising hydrophilically treating the glass slides, then coating the graphene oxide adhesive evenly between the two slides, and drying. As a result, the two slides are bonded by graphene oxide.

By testing the bonding performance of 6 adhesive samples, it is found that when C/O is less than or equal to 3:1, a good bonding effect is exhibited, and the bonding effect of two adhesive samples with a C/O ratio of 2:4 and 5:1 respectively is poor.

Example 1-3

In this example, the bonding properties of graphene oxide adhesives with various size distributions are studied under the conditions that follow.

The graphene oxide used has a size distribution as shown in Table 1, the overall C/O ratio is 2.5:1, and the content of single-layer graphene oxide is 91.6%. An aqueous graphene oxide solution having a concentration of 4 mg/ml is formulated, and two glass slides are bonded therewith through a method comprising hydrophilically treating the glass slides, then coating the graphene oxide adhesive evenly between the two slides, and drying. As a result, the two slides are bonded by graphene oxide.

The bonding effects of graphene oxide adhesives with various size distributions are shown in Table 1. It can be seen from the table that the amount of graphene oxide sheets with a size of less than 5 μm should not be more than 10%, and the amount of graphene oxide sheets with a size of greater than 30 μm should not be less than 60%.

TABLE 1

|  | Size of GO | | | Bonding effect |
|---|---|---|---|---|
|  | Less than 5 μm | Greater than 30 μm | 5-30 μm |  |
| Content % | 20 | 50 | 30 | Fall off |
|  | 20 | 60 | 20 | 0.01 MPa |
|  | 20 | 70 | 10 | 0.01 MPa |
|  | 5 | 60 | 35 | 0.06 MPa |
|  | 10 | 60 | 30 | 0.05 MPa |
|  | 10 | 70 | 20 | 0.05 MPa |
|  | 5 | 50 | 45 | 0.03 MPa |
|  | 5 | 20 | 75 | Fall off |

Example 1-4

(1) Graphene oxide with a C/O ratio of 3:1 and a proportion of single-layer graphene oxide of 81.4% is used, in which the amount of graphene oxide sheets with a size of less than 5 μm is 6%, the amount of graphene oxide sheets with a size of greater than 30 μm is 71%, and the rest has a size between 5-30 μm. A graphene oxide dispersion having a concentration of 4 mg/ml is formulated, where the dispersing phase is water, and this dispersion is used as a graphene adhesive.

(2) The graphene adhesive is evenly coated on the surface of the polyethylene terephthalate (PET) material, and then dried, to effect the bonding. The bonding strength is tested to reach 0.11 MPa.

Example 1-5

(1) Graphene oxide with a C/O ratio of 2.3:1 is used, in which the amount of graphene oxide sheets with a size of less than 5 μm is 10%, the amount of graphene oxide sheets with a size of greater than 30 μm is 87%, and the rest has a size between 5-30 μm. A graphene oxide dispersion having a concentration of 16 mg/ml is formulated, where the dispersing phase is water, and this dispersion is used as a graphene adhesive.

(2) The graphene adhesive is evenly coated on the surface of the polyimide (PI) material, and then dried, to effect the bonding. The bonding strength is tested to reach 0.36 MPa.

Example 1-6

(1) Graphene oxide with a C/O ratio of 0.5:1 and a proportion of single-layer graphene oxide of 96.8% is used, in which the amount of graphene oxide sheets with a size of less than 5 μm is 3%, the amount of graphene oxide sheets with a size of greater than 30 μm is 94%, and the rest has a size between 5-30 μm. A graphene oxide dispersion having a concentration of 18 mg/ml is formulated, where the dispersing phase is DMF, and this dispersion is used as a graphene adhesive.

(2) The graphene adhesive is evenly coated on the surface of the glass material, and then dried to effect the bonding. The bonding strength is tested to reach 0.45 MPa.

Example 1-7

(1) Graphene oxide with a C/O ratio of 1.7:1 and a proportion of single-layer graphene oxide of 88.9% is used, in which the size is controlled to the range of 50-80 μm. A graphene oxide dispersion having a concentration of 18 mg/ml is formulated, where the dispersing phase is water, and this dispersion is used as a graphene adhesive.

(2) The graphene adhesive is evenly coated on the surface of the paper material, and then dried to effect the bonding. The bonding strength is tested to reach 0.62 MPa.

Example 1-8

(1) Graphene oxide with a C/O ratio of 3:1 and a proportion of single-layer graphene oxide of 97.5% is used, in which the amount of graphene oxide sheets with a size of less than 5 μm is 4%, the amount of graphene oxide sheets with a size of greater than 30 μm is 91%, and the rest has a size between 5-30 μm. A graphene oxide dispersion having a concentration of 18 mg/ml is formulated, where the dispersing phase is water, and this dispersion is used as a graphene adhesive.

(2) The graphene adhesive is evenly coated on the surface of the ceramic material, and then dried to effect the bonding. The bonding strength is tested to reach 0.22 MPa.

Example 2-1

In this example, the effect of graphene oxide solutions at various concentrations on the final bonding property of graphene is studied specifically as follows.

In the graphene oxide solution used, the amount of graphene oxide sheets with a size of less than 5 μm is 8±1%, the amount of graphene oxide sheets with a size of greater than 30 μm is 70±3%, and the rest has a size between 5-30 μm, and the overall C/O ratio is 2:1, and single-layer graphene oxide accounts for 98.8% of the total amount of graphene oxide.

Aqueous graphene oxide solutions having a concentration of 2-20 mg/ml are formulated, and two glass slides are bonded therewith through a method comprising hydrophilically treating the glass slides, then coating the graphene oxide adhesive evenly between the two slides, drying, and chemically reducing with hydrazine hydrate vapor at 95° C., where the graphene has a C/O ratio of about 6:1 after reduction. As a result, the two slides are bonded by graphene oxide.

Figure 5:
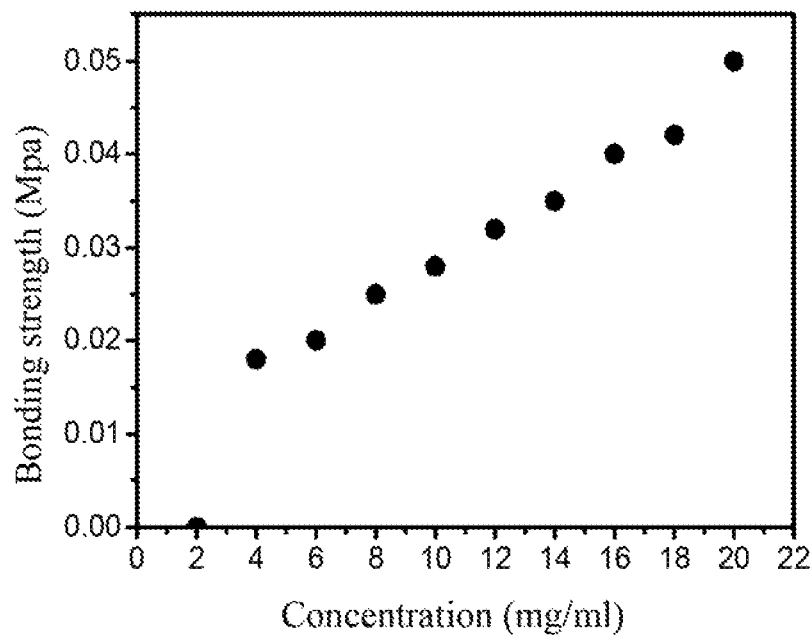
FIG. 5 is a graph showing the bonding performance of various concentrations of adhesives (graphene oxide after reduction).

The bonding effect at various concentrations is shown in FIG. 5. It can be seen from the figure that a good bonding effect is exhibited when the concentration of graphene oxide is more than 4 mg/ml.

Example 2-2

In this example, the effect of graphene oxide with various size distributions on the final bonding property of graphene is studied specifically as follows.

The graphene oxide used has a size distribution as shown in Table 2, the overall C/O ratio is 2:1, and the content of single-layer graphene oxide is 95.8%. An aqueous graphene oxide solution having a concentration of 4 mg/ml is formulated, and two glass slides are bonded therewith through a method comprising hydrophilically treating the glass slides, then coating the graphene oxide adhesive evenly between the two slides, drying, and chemically reducing with hydroiodic acid vapor at 90° C., where the graphene has a C/O ratio of about 5:1 after reduction. As a result, the two slides are bonded by graphene oxide.

The bonding effects of graphene oxide adhesives with various size distributions are shown in Table 2. It can be seen from the table that the amount of graphene oxide sheets with a size of less than 5 μm should not be more than 10%, and the amount of graphene oxide sheets with a size of greater than 30 μm should not be less than 65%.

TABLE 2

|  | Size of GO | | | Bonding effect |
| --- | --- | --- | --- | --- |
|  | Less than 5 μm | Greater than 30 μm | 5-30 μm |  |
| Content % | 15 | 45 | 40 | Fall off |
|  | 20 | 60 | 20 | Fall off |
|  | 20 | 70 | 10 | 0.01 MPa |
|  | 5 | 70 | 25 | 0.02 MPa |
|  | 10 | 65 | 25 | 0.02 MPa |
|  | 10 | 80 | 10 | 0.02 MPa |
|  | 5 | 60 | 35 | 0.01 MPa |
|  | 5 | 20 | 75 | Fall off |

Example 2-3

In this example, the effect of graphene oxide with various degrees of reduction (various C/O ratio) on the final bonding property is studied specifically as follows.

The size of graphene oxide used is 30-80 μm, and the C/O ratio varies in the range of 2:1-3:1. The single-layer graphene oxide accounts for 84.1% of the total graphene oxide. An aqueous graphene oxide solution having a concentration of 8 mg/ml is formulated, and two ITO sheets are bonded therewith through a method comprising hydrophilically treating the ITO sheet, then coating the graphene oxide adhesive evenly between the two ITO sheets, drying, and thermally reducing under vacuum by slowly heating up to 300° C. at a ramping rate of 1° C./min, or chemically reducing with hydrazine hydrate vapor. Through the selection of C/O ratio in graphene oxide and control of the reduction method, the C/O ratio in the reduced graphene is 3.5:1, 4:1, 5:1, and 6:1.

On the one hand, the bonding performance test is performed on 4 bonded samples, and it is found that the bonding effect decreases with the increase of the C/O ratio (the increase of the reduction degree). However, due to the advantages such as size distribution of and the proportion of single-layer graphene in the graphene sheet, a good bonding effect is always maintained. On the other hand, the electrical conductivity of the two bonded ITO is tested. The test result shows that the conductivity of the adhesive layer is significantly improved with increasing C/O ratio, and when the C/O ratio is 4:1, the conductivity of the ITO itself is achieved.

It can be known from the above example that the carbon/oxygen ratio, size distribution and concentration of graphene oxide precursor can be adjusted by those skilled in the art according to the practical requirements for bonding effect and electrical conductivity, so as to achieve perfect bonding using the bonding method of the present invention. For example, if a high conductivity is required, the reduced graphene needs to have a high carbon/oxygen ratio. At this time, the bonding can be achieved by increasing the content of large-sized graphene sheets or increasing the concentration of graphene oxide precursor.

Example 2-4

(1) Graphene oxide with a proportion of single-layer graphene oxide of 81.4% is used, in which the amount of graphene oxide sheets with a size of less than 5 μm is 6%, the amount of graphene oxide sheets with a size of greater than 30 μm is 87%, and the rest has a size between 5-30 μm. A graphene oxide dispersion having a concentration of 4 mg/ml is formulated, where the dispersing phase is water, and this dispersion is used as a graphene adhesive.

(2) The graphene adhesive is evenly coated on the surface of the polyaniline material, and then dried to effect the bonding. The bonding strength is tested to reach 0.11 MPa.

(3) After reduction with a hydroiodic acid solution at 90° C. for 30 min, the C/O ratio is tested to be 4:1. The bonding strength at the bonding site is tested to be 0.04 MPa, and excellent electrical conductivity and resistance to acids, alkali and salts are exhibited.

Example 2-5

(1) Graphene oxide with a proportion of single-layer graphene oxide of 96.3% is used, in which the amount of graphene oxide sheets with a size of less than 5 μm is 3%, the amount of graphene oxide sheets with a size of greater than 30 μm is 91%, and the rest has a size between 5-30 μm. A graphene oxide dispersion having a concentration of 16 mg/ml is formulated, where the dispersing phase is water, and this dispersion is used as a graphene adhesive.

(2) The graphene adhesive is evenly coated on the surface of an iron sheet, and then dried to effect the bonding. The bonding strength is tested to reach 0.36 MPa.

(3) After reduction with a hydrazine hydrate solution at 70° C. for 20 min, the C/O ratio is tested to be 4:1. The bonding strength at the bonding site is tested to be 0.04 MPa, and the electrical conductivity and resistance to acids, alkali and salts are exhibited.

Example 2-6

(1) Graphene oxide with a proportion of single-layer graphene oxide of 97.2% is used, in which the size is controlled to the range of 50-80 μm. A graphene oxide dispersion having a concentration of 12 mg/ml is formulated, where the dispersing phase is DMF, and this dispersion is used as a graphene adhesive.

(2) The graphene adhesive is evenly coated on the surface of the electrically conductive glass material, and then dried, to effect the bonding. The bonding strength is tested to reach 0.11 MPa.

(3) After 20 min of thermal reduction by heating to 200° C. at a ramping rate of 1° C./min, the C/O ratio is tested to be 4:1. The bonding strength at the bonding site is tested to be 0.03 MPa, and the electrical conductivity and resistance to acids, alkali and salts are exhibited.

Example 2-7

(1) Graphene oxide with a proportion of single-layer graphene oxide of 95.4% is used, in which the size is controlled to the range of 50-80 μm. A graphene oxide dispersion having a concentration of 18 mg/ml is formulated, where the dispersing phase is water, and this dispersion is used as a graphene adhesive.

(2) The graphene adhesive is evenly coated on the surface of the electrically conductive ceramic material, and then dried. The bonding strength is tested to reach 0.22 MPa.

(3) After reduction with a hydroiodic acid solution at 80° C. for 60 min, the C/O ratio is tested to be 5:1. The bonding strength at the bonding site is tested to be 0.02 MPa, and the electrical conductivity and resistance to acids, alkali and salts are exhibited.

Example 3-1

(1) Commercially available carbon fibers T800H are refluxed in acetone at 80° C. for 72 hrs to remove the sizing agent on the surface. Then the fibers are immersed in hydrogen peroxide at 110° C. for 2 hrs and then in concentrated nitric acid at 115° C. for 12 hrs, and finally washed with water and dried, to obtain carbon fibers with a surface modified by oxidation.

Figure 6:
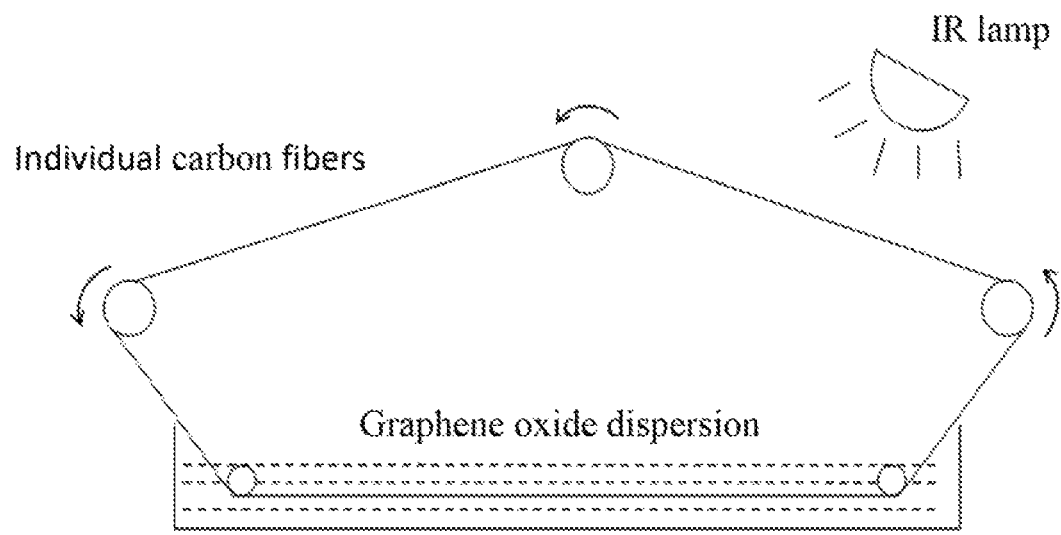
FIG. 6 is a schematic diagram of a continuous coating apparatus.

(2) The surface of the carbon fibers is repeatedly coated with an aqueous graphene oxide dispersion (in which the graphene oxide sheet has a size of 40-50 μm, and a concentration as shown in Table 3) by the continuous coating equipment as shown in FIG. 6, and dried (at a temperature of 40° C.). The process is repeated 15 times, and carbon fibers coated with graphene oxide are obtained.

(3) 30 carbon fibers coated with graphene oxide are immersed and swelled in a water tank, and they are drawn out from the water simultaneously. The fibers spontaneously approach each other to form a tow due to the surface tension of water. Subsequently, the tow is dried at room temperature, and the volatilization of water allows the graphene oxide sheets on the surface of the carbon fibers to be fused to each other, so that the carbon fibers are crosslinked with each other.

(4) The carbon fiber tow crosslinked with graphene oxide is thermally reduced at 3000° C. to obtain a high-performance carbon fiber tow crosslinked with graphene.

After the above steps, the tow of 30 carbon fibers is completely cross-linked by graphene, which is stacked on each other in the axial direction. The tow density is 1.7 g/cm$^3$, the tensile strength is 4.9 GPa, the electrical conductivity is 0.8×10$^5$ S/m, and the thermal conductivity is 43 W/mK.

strength, electrical conductivity, and thermal conductivity of the obtained carbon fiber tow are lowered, and the cross-linking effect is deteriorated. As the concentration of graphene oxide rises, the thickness of graphene oxide on the surface of the carbon fibers increases, and is uniformly distributed along the fiber axis; the density, tensile strength, electrical conductivity, and thermal conductivity of the obtained carbon fiber tow are lowered, and the cross-linking effect is deteriorated.

Example 3-2

Step (1) is the same as that in Example 3-1.

(2) The surface of the carbon fibers are repeatedly coated with a 7 mg/ml aqueous graphene oxide dispersion (in which the graphene oxide sheet has a size of 40-50 μm) by continuous coating equipment, and dried (at a temperature of 25° C.). The process is repeated 20 times, and carbon fibers coated with graphene oxide are obtained. The thickness of the graphene oxide coating is about 3.8 μm, and is uniformly distributed along the fiber axis.

(3) About 1000 carbon fibers (metric method) coated with graphene oxide are immersed and swelled in a water tank, and they are drawn out from the water simultaneously. The fibers spontaneously approach each other to form a tow due to the surface tension of water. Subsequently, the tow is dried at room temperature, and the volatilization of water allows the graphene oxide sheets on the surface of the carbon fibers to be fused to each other, so that the carbon fibers are crosslinked with each other.

(4) The carbon fiber tow crosslinked with graphene oxide is reduced with hydroiodic acid to obtain a high-performance carbon fiber tow crosslinked with graphene.

After the above steps, the tow of 1000 carbon fibers is completely cross-linked by graphene, which is stacked on each other in the axial direction. The tow density is 1.4 g/cm$^3$, the tensile strength is 3.9 GPa, the electrical conductivity is 6.0×10$^4$ S/m, and the thermal conductivity is 18 W/mK.

Example 3-3

(1) Commercially available carbon fibers T800H are refluxed in acetone at 57° C. for 72 hrs to remove the sizing agent on the surface. Then the fibers are immersed in

TABLE 3

| Concentration of graphene oxide (mg/ml) | Thickness of graphene oxide layer (μpm) | Tow density (g/cm$^3$) | Tensile strength (GPa) | Electrical conductivity (S/m) | Thermal conductivity (W/mK) |
| --- | --- | --- | --- | --- | --- |
| 0.1 | 0.5 | 0.9 | 1 | 1.2 × 10$^3$ | 34 |
| 1 | 1 | 1.4 | 1.8 | 3 × 10$^4$ | 39 |
| 7 | 3 | 1.7 | 4.9 | 8 × 10$^4$ | 43 |
| 13 | 5.2 | 0.8 | 0.8 | 0.9 × 10$^3$ | 32 |

It can be seen from Table 3 that with the same number of coatings, when the concentration of graphene oxide is 7 mg/ml, the thickness of the graphene oxide coating on the surface of the carbon fibers is 3 μm, and is uniformly distributed along the fiber axis; the density, tensile strength, electrical conductivity, and thermal conductivity of the obtained carbon fiber tow are the highest; and the cross-linking effect is optimum. As the concentration of graphene oxide declines, the thickness of graphene oxide on the surface of the carbon fibers decreases; the density, tensile hydrogen peroxide at 108° C. for 2 hrs and then in concentrated nitric acid at 115° C. for 12 hrs, and finally washed with water and dried, to obtain carbon fibers with a surface modified by oxidation.

(2) The surface of the carbon fibers are repeatedly coated with a 7 mg/ml aqueous graphene oxide dispersion (in which the graphene oxide sheet has a size of 40-50 μm) by continuous coating equipment, and dried (at a temperature of 40° C.). The process is repeated 15 times, and carbon fibers coated with graphene oxide are obtained. The thickness of the graphene oxide coating is about 3 μm, and is uniformly distributed along the fiber axis.

(3) The carbon fibers coated with graphene oxide are woven into a woven fabric of 50×50 by plain weaving, immersed in a water tank for 3 min, taken out, and dried at 60° C. The volatilization of water allows the graphene oxide sheets on the surface of the carbon fibers at the contact nodes in the woven fabric to be fused to each other, so that the carbon fibers are crosslinked with each other, to obtain a carbon fiber woven fabric crosslinked with graphene oxide.

(4) The carbon fiber woven fabric crosslinked with graphene oxide is thermally reduced at 3000° C. to obtain a high-performance carbon fiber woven fabric crosslinked with graphene.

After the above steps, the carbon fibers at the contact nodes in the woven fabric are completely cross-linked by graphene, which is stacked on each other. The tensile strength is 4.1 GPa, the electrical conductivity is 0.4×10$^5$ S/m, and the thermal conductivity is 36 W/mK.

Example 3-4

(1) Commercially available carbon fibers T800H are refluxed in acetone at 100° C. for 6 hrs to remove the sizing agent on the surface. Then the fibers are immersed in hydrogen peroxide at 108° C. for 2 hrs and then in concentrated nitric acid at 115° C. for 12 hrs, and finally washed with water and dried, to obtain carbon fibers with a surface modified by oxidation.

(2) The surface of the carbon fibers are repeatedly coated with a 7 mg/ml aqueous graphene oxide dispersion (in which the graphene oxide sheet has a size of 40-50 μm) by continuous coating equipment, and dried (at a temperature of 50° C.). The process is repeated 15 times, and carbon fibers coated with graphene oxide are obtained. The thickness of the graphene oxide coating is about 3 μm, and is uniformly distributed along the fiber axis.

(3) The carbon fibers coated with graphene oxide are cut into short fibers, dispersed an aqueous solution, filtered under suction, and dried at 60° C. The volatilization of water allows the graphene oxide sheets on the surface of the carbon fibers at the contact nodes in the non-woven fabric to be fused to each other, so that the carbon fibers are crosslinked with each other, to obtain a carbon fiber non-woven fabric crosslinked with graphene oxide.

(4) The carbon fiber woven fabric crosslinked with graphene oxide is thermally reduced at 3000° C. to obtain a high-performance carbon fiber non-woven fabric crosslinked with graphene.

After the above steps, the carbon fibers at the contact nodes in the non-woven fabric are completely cross-linked by graphene, which is stacked on each other. The tensile strength is 600 MPa, the electrical conductivity is 0.6×10$^5$ S/m, and the thermal conductivity is 42 W/mK.

In addition, it is found through comparison of Examples 3-1 to 3-4 that in the carbon fiber tows obtained in Examples 3-1 and 3-2, the graphene sheets are more uniformly dispersed than in other examples, indicating that the carbon fibers modified by the oxidation modification scheme in Example 3-1 have better affinity with the active groups on the surface of graphene oxide.

Example 4-1

(1) The surface of boron nitride fibers is repeatedly coated with an aqueous graphene oxide dispersion and dried. The process is repeated 15 times, to obtain boron nitride fibers coated with graphene oxide on the surface. The thickness of the graphene oxide layer is 3 μm.

(2) The boron nitride fibers coated with graphene oxide obtained in Step (1) are subjected to surface swelling in water, and then overlapped and dried to form a non-woven fabric, where the drying temperature is below 100° C.

(3) The graphene oxide crosslinked boron nitride fibers obtained in Step (2) are placed in a closed vessel containing hydrazine hydrate and reduced at 80° C. for 12 hrs.

Through the above steps, graphene is coated on the surface of the boron nitride fibers, and the surface of the boron nitride fibers and the graphene sheet are connected by van der Waals force and hydrogen bonding. The boron nitride fibers are cross-linked by graphene coated on the surface, and the composite fibers are randomly overlapped to form a non-woven fabric structure. The areal density is 90.9 g/m$^2$, the breaking strength is 1.98 GPa, the breaking strength retention rate is 86% after immersion for 24 hrs in water at 25° C., the electrical conductivity is 2.3×10$^4$ S/m, and the thermal conductivity is 29 W/mK.

TABLE 4

| Concentration of graphene oxide (mg/ml) | Thickness of graphene oxide layer (μm) | Areal density of composite fiber (g/m$^2$) | Breaking strength (GPa) | Breaking strength retention rate after immersion for 24 hrs in water at 25° C. (%) | Electrical conductivitvity (S/m) | Thermal conductivity (W/mK) |
|---|---|---|---|---|---|---|
| 0 | 0 | 82.1 | 1.84 | 51 | — | — |
| 0.1 | 0.5 | 83.7 | 1.93 | 78 | $1.1 \times 10^3$ | 21 |
| 1 | 1 | 85 | 1.96 | 81 | $4.9 \times 10^3$ | 23 |
| 7 | 3 | 90.9 | 1.98 | 86 | $2.3 \times 10^4$ | 29 |
| 13 | 5.2 | 95.6 | 1.92 | 83 | $1.9 \times 10^3$ | 24 |

In addition, the graphene oxide concentration and coating thickness are the optimum results obtained after repeated testes. It can be seen from Table 4 that with the same number of coatings, when the concentration of graphene oxide is 7 mg/ml, the thickness of the graphene oxide coating on the surface of the boron carbide fibers is 3 μm; the breaking strength, electrical conductivity, and thermal conductivity of the obtained boron carbide fiber non-woven fabric are the highest; the hydrolytic stability is good, and the cross-linking effect is optimum. As the concentration of graphene oxide declines, the thickness of graphene oxide on the surface of the boron carbide fibers decreases; the breaking strength, electrical conductivity, and thermal conductivity of the obtained boron carbide fiber non-woven fabric are lowered; and the cross-linking effect and water resistance are deteriorated. As the concentration of graphene oxide rises, the thickness of graphene oxide on the surface of the boron carbide fibers increases, and distributed unevenly, and the degree of crosslinking decreases; the breaking strength, electrical conductivity, and thermal conductivity of the obtained boron carbide fiber non-woven fabric are lowered; and the hydrolytic stability is deteriorated.

Example 4-2

(1) The surface of boron nitride fibers is repeatedly coated with a graphene oxide dispersion in N,N-dimethyl formamide and dried. The process is repeated 13 times, to obtain boron nitride fibers coated with graphene oxide on the surface. The thickness of the graphene oxide layer is 3 μm.

(2) The boron nitride fibers coated with graphene oxide obtained in Step (1) are subjected to surface swelling in a solvent, and then overlapped and dried to form a non-woven fabric, where the drying temperature is below 100° C.

(3) The graphene oxide crosslinked boron nitride fibers obtained in Step (2) are placed in a closed vessel containing hydrazine hydrate and reduced at 80° C. for 12 hrs.

Through the above steps, graphene is coated on the surface of the boron nitride fibers, and the surface of the boron nitride fibers and the graphene sheet are connected by van der Waals force and hydrogen bonding. The boron nitride fibers are cross-linked by graphene coated on the surface, and the composite fibers are randomly overlapped to form a non-woven fabric structure. The areal density is 91.1 g/m$^2$, the breaking strength is 1.94 GPa, the breaking strength retention rate is 84% after immersion for 24 hrs in water at 25° C., the electrical conductivity is 1.7×10$^4$ S/m, and the thermal conductivity is 26 W/mK.

Example 4-3

(1) The surface of boron nitride fibers is repeatedly coated with a graphene oxide dispersion in ethanol and dried. The process is repeated 16 times, to obtain boron nitride fibers coated with graphene oxide on the surface. The thickness of the graphene oxide layer is 3 μm.

(2) The boron nitride fibers coated with graphene oxide obtained in Step (1) are subjected to surface swelling in a solvent, and then overlapped and dried to form a non-woven fabric, where the drying temperature is below 100° C.

(3) The graphene oxide crosslinked boron nitride fibers obtained in Step (2) are placed in a closed vessel containing hydroiodic acid and reduced at 90° C. for 18 hrs.

Through the above steps, graphene is coated on the surface of the boron nitride fibers, and the surface of the boron nitride fibers and the graphene sheet are connected by van der Waals force and hydrogen bonding. The boron nitride fibers are cross-linked by graphene coated on the surface, and the composite fibers are randomly overlapped to form a non-woven fabric structure. The areal density is 91.7 g/m$^2$, the breaking strength is 1.99 GPa, the breaking strength retention rate is 88% after immersion for 24 hrs in water at 25° C., the electrical conductivity is 2.7×10$^4$ S/m, and the thermal conductivity is 30 W/mK.

Example 4-4

(1) The surface of boron nitride fibers that are arranged in parallel is repeatedly coated with a graphene oxide dispersion in ethylene glycol and dried. The process is repeated 12 times, to obtain boron nitride filament fibers coated with graphene oxide on the surface. The thickness of the graphene oxide layer is 3 μm.

(2) The boron nitride filament fibers coated with graphene oxide obtained in Step (1) are subjected to surface swelling in ethylene glycol, and then combined and dried to form a non-twisted yarn, where the drying temperature is below 100° C. to volatilize ethylene glycol.

(3) The graphene oxide crosslinked boron nitride filament fibers obtained in Step (2) are placed in a closed vessel containing hydroiodic acid and reduced at 90° C. for 18 hrs.

Through the above steps, graphene is coated on the surface of the boron nitride fibers, and the surface of the boron nitride fibers and the graphene sheet are connected by van der Waals force and hydrogen bonding. The boron nitride fibers are cross-linked by graphene coated on the surface, and the composite fibers are arranged in parallel to form a non-twisted yarn structure. The breaking strength is 2.09 GPa, the breaking strength retention rate is 85% after immersion for 24 hrs in water at 25° C., the electrical conductivity is 2.4×10$^4$ S/m, and the thermal conductivity is 26 W/mK.

Example 4-5

(1) The surface of boron nitride fibers that are arranged in parallel is repeatedly coated with an aqueous graphene oxide dispersion and dried. The process is repeated 15 times, to obtain boron nitride fibers coated with graphene oxide on the surface. The thickness of the graphene oxide layer is 3 μm.

(2) The boron nitride fibers coated with graphene oxide obtained in Step (1) are subjected to surface swelling in ethylene glycol, and then combined and dried to form a non-twisted yarn, where the drying temperature is below 100° C. to volatilize ethylene glycol.

(3) The graphene oxide crosslinked boron nitride filament fibers obtained in Step (2) are placed in a closed vessel containing hydroiodic acid and reduced at 90° C. for 18 hrs.

Through the above steps, graphene is coated on the surface of the boron nitride fibers, and the surface of the boron nitride fibers and the graphene sheet are connected by van der Waals force and hydrogen bonding. The boron nitride fibers are cross-linked by graphene coated on the surface, and the composite fibers are arranged in parallel to form a non-twisted yarn structure. The breaking strength is 2.14 GPa, the breaking strength retention rate is 85% after immersion for 24 hrs in water at 25° C., the electrical conductivity is 3.1×10$^4$ S/m, and the thermal conductivity is 28 W/mK.

Example 5-1

(1) Quartz fibers are soaked in toluene, heated to 300° C. for 10 min, and dried.

(2) The surface of quartz fibers obtained in Step (1) is repeatedly coated with an aqueous graphene oxide dispersion and dried. The process is repeated 15 times, to obtain quartz fibers coated with graphene oxide on the surface. The thickness of the graphene oxide layer is 3 μm.

(3) The quartz fibers coated with graphene oxide obtained in Step (2) are subjected to surface swelling in water, and then overlapped and dried to form a non-woven fabric, where the drying temperature is below 100° C.

(4) The graphene oxide crosslinked quartz fibers obtained in Step (3) are placed in a closed vessel containing hydrazine hydrate and reduced at 80° C. for 12 hrs.

Through the above steps, graphene is coated on the surface of the quartz fibers, and the surface of the quartz fibers and the graphene sheet are connected by van der Waals force and hydrogen bonding. The quartz fibers are cross-linked by graphene coated on the surface, and the composite fibers are randomly overlapped to form a non-woven fabric structure. The areal density is 87.1 g/m$^2$, the breaking strength is 2.2 GPa, the strength retention rate is 89% after immersion for 12 hrs in alkali liquor at pH 12, the electrical conductivity is 4.9×104 S/m, and the thermal conductivity is 23 W/mK.

TABLE 5

| Concentration of graphene oxide (mg/ml) | Thickness of graphene oxide layer (μm) | Areal density of composite fiber (g/m²) | Breaking strength (GPa) | Strength retention rate after immersion in alkali liquor (%) | Electrical conductivitvity (S/m) | Thermal conductivity (W/mK) |
|---|---|---|---|---|---|---|
| 0 | 0 | 80.7 | 1.72 | 35 | — | — |
| 0.1 | 0.5 | 81.6 | 1.81 | 81 | $7.6 \times 10^2$ | 11 |
| 1 | 1 | 82.6 | 1.94 | 84 | $2.4 \times 10^3$ | 16 |
| 7 | 3 | 87.1 | 2.2 | 89 | $4.9 \times 10^4$ | 23 |
| 13 | 5.2 | 91 | 1.84 | 82 | $2.2 \times 10^3$ | 18 |

In addition, the graphene oxide concentration and coating thickness are the optimum results obtained after repeated testes. It can be seen from Table 5 that with the same number of coatings, when the concentration of graphene oxide is 7 mg/ml, the thickness of the graphene oxide coating on the surface of the quartz fibers is 3 μm; the breaking strength, electrical conductivity, and thermal conductivity of the obtained quartz fiber non-woven fabric are the highest; and the cross-linking effect is optimum. As the concentration of graphene oxide declines, the thickness of graphene oxide on the surface of the quartz fibers decreases; the breaking strength, electrical conductivity, and thermal conductivity of the obtained quartz fiber non-woven fabric are lowered; and the cross-linking effect and alkali resistance are deteriorated. As the concentration of graphene oxide rises, the thickness of graphene oxide on the surface of the quartz fibers increases, and distributed unevenly, and the degree of cross-linking decreases; and the breaking strength, electrical conductivity, and thermal conductivity of the obtained quartz fiber non-woven fabric are lowered.

Example 5-2

(1) Quartz fibers are soaked in toluene, heated to 300° C. for 10 min, and dried.

(2) The surface of quartz fibers obtained in Step (1) is repeatedly coated with a graphene oxide dispersion in N,N-dimethylformamide and dried. The process is repeated 13 times, to obtain quartz fibers coated with graphene oxide on the surface. The thickness of the graphene oxide layer is 3 μm.

(3) The quartz fibers coated with graphene oxide obtained in Step (2) are subjected to surface swelling in water, and then overlapped and dried to form a non-woven fabric, where the drying temperature is below 100° C.

(4) The graphene oxide crosslinked quartz fibers obtained in Step (3) are placed in a closed vessel containing hydrazine hydrate and reduced at 80° C. for 12 hrs.

Through the above steps, graphene is coated on the surface of the quartz fibers, and the surface of the quartz fibers and the graphene sheet are connected by van der Waals force and hydrogen bonding. The quartz fibers are cross-linked by graphene coated on the surface, and the composite fibers are randomly overlapped to form a non-woven fabric structure. The areal density is 88.3 g/m², the breaking strength is 2.1 GPa, the strength retention rate is 87% after immersion for 12 hrs in alkali liquor at pH 12, the electrical conductivity is $5.1 \times 10^4$ S/m, and the thermal conductivity is 25 W/mK.

Example 5-3

(1) Quartz fibers are soaked in toluene, heated to 300° C. for 10 min, and dried.

(2) The surface of quartz fibers obtained in Step (1) is repeatedly coated with a graphene oxide dispersion in ethanol and dried. The process is repeated 16 times, to obtain quartz fibers coated with graphene oxide on the surface. The thickness of the graphene oxide layer is 3 μm.

(3) The quartz fibers coated with graphene oxide obtained in Step (2) are subjected to surface swelling in water, and then overlapped and dried to form a non-woven fabric, where the drying temperature is below 100° C.

(4) The graphene oxide crosslinked quartz fibers obtained in Step (3) are placed in a closed vessel containing hydroiodic acid and reduced at 90° C. for 18 hrs.

Through the above steps, graphene is coated on the surface of the quartz fibers, and the surface of the quartz fibers and the graphene sheet are connected by van der Waals force and hydrogen bonding. The quartz fibers are cross-linked by graphene coated on the surface, and the composite fibers are randomly overlapped to form a non-woven fabric structure. The areal density is 86.4 g/m², the breaking strength is 2.3 GPa, the strength retention rate is 82% after immersion for 12 hrs in alkali liquor at pH 12, the electrical conductivity is $3.9 \times 10^4$ S/m, and the thermal conductivity is 22 W/mK.

Example 5-4

(1) Quartz fibers that are arranged in parallel are soaked in toluene, heated to 300° C. for 10 min, and dried.

(2) The surface of quartz fibers obtained in Step (1) is repeatedly coated with a graphene oxide dispersion in ethylene glycol and dried. The process is repeated 12 times, to obtain quartz filament fibers coated with graphene oxide on the surface. The thickness of the graphene oxide layer is 3 μm.

(3) The quartz filament fibers coated with graphene oxide obtained in Step (2) are subjected to surface swelling in ethylene glycol, and then combined and dried to form a non-twisted yarn, where the drying temperature is below 100° C. to volatilize ethylene glycol.

(4) The graphene oxide crosslinked quartz filament fibers obtained in Step (3) are placed in a closed vessel containing hydroiodic acid and reduced at 90° C. for 18 hrs.

Through the above steps, graphene is coated on the surface of the quartz fibers, and the surface of the quartz fibers and the graphene sheet are connected by van der Waals force and hydrogen bonding. The quartz fibers are cross-linked by graphene coated on the surface, and the composite fibers are arranged in parallel to form a non-twisted yarn structure. The breaking strength is 2.7 GPa, the strength retention rate is 84% after immersion for 12 hrs in alkali liquor at pH 12, the electrical conductivity is $6.8 \times 10^4$ S/m, and the thermal conductivity is 29 W/mK.

Example 5-5

(1) Quartz fibers that are arranged in parallel are soaked in toluene, heated to 300° C. for 10 min, and dried.

(2) The surface of quartz fibers obtained in Step (1) is repeatedly coated with an aqueous graphene oxide dispersion and dried. The process is repeated 15 times, to obtain quartz fibers coated with graphene oxide on the surface. The thickness of the graphene oxide layer is 3 µm.

(3) The quartz fibers coated with graphene oxide obtained in Step (2) are subjected to surface swelling in ethylene glycol, and then combined and dried to form a non-twisted yarn, where the drying temperature is below 100° C. to volatilize ethylene glycol.

(4) The graphene oxide crosslinked quartz filament fibers obtained in Step (3) are placed in a closed vessel containing hydroiodic acid and reduced at 90° C. for 18 hrs.

Through the above steps, graphene is coated on the surface of the quartz fibers, and the surface of the quartz fibers and the graphene sheet are connected by van der Waals force and hydrogen bonding. The quartz fibers are cross-linked by graphene coated on the surface, and the composite fibers are arranged in parallel to form a non-twisted yarn structure. The breaking strength is 2.8 GPa, the strength retention rate is 82% after immersion for 12 hrs in alkali liquor at pH 12, the electrical conductivity is $6.3 \times 10^4$ S/m, and the thermal conductivity is 27 W/mK.

Example 6-1

(1) The surface of silicon carbide fibers having a round cross section is repeatedly coated with an aqueous graphene oxide dispersion and dried. The process is repeated 15 times, to obtain silicon carbide fibers coated with graphene oxide on the surface. The thickness of the graphene oxide layer is 3 µm.

(2) The silicon carbide fibers coated with graphene oxide obtained in Step (1) are subjected to surface swelling in water, and then overlapped and dried to form a non-woven fabric, where the drying temperature is below 100° C.

(3) The graphene oxide crosslinked silicon carbide fibers obtained in Step (2) are placed in a closed vessel containing hydrazine hydrate and reduced at 80° C. for 12 hrs.

Through the above steps, graphene is coated on the surface of the silicon carbide fibers, and the surface of the silicon carbide fibers and the graphene sheet are connected by van der Waals force. The silicon carbide fibers are cross-linked by graphene coated on the surface, and the composite fibers are randomly overlapped to form a non-woven fabric structure. The areal density is 11 g/m², the breaking strength is 2.91 GPa, the electrical conductivity is $2.8 \times 10^4$ S/m, and the thermal conductivity is 22 W/mK.

In addition, the graphene oxide concentration and coating thickness are the optimum results obtained after repeated testes. It can be seen from Table 6 that with the same number of coatings, when the concentration of graphene oxide is 7 mg/ml, the thickness of the graphene oxide coating on the surface of the silicon carbide fibers is 3 µm; the breaking strength, electrical conductivity, and thermal conductivity of the obtained silicon carbide fiber non-woven fabric are the highest; and the cross-linking effect is optimum. As the concentration of graphene oxide declines, the thickness of graphene oxide on the surface of the silicon carbide fibers decreases; the breaking strength, electrical conductivity, and thermal conductivity of the obtained silicon carbide fiber non-woven fabric are lowered; and the cross-linking effect is deteriorated. As the concentration of graphene oxide rises, the thickness of graphene oxide on the surface of the silicon carbide fibers increases, and distributed unevenly, and the degree of crosslinking decreases; and the breaking strength, electrical conductivity, and thermal conductivity of the obtained silicon carbide fiber non-woven fabric are lowered.

Example 6-2

(1) The surface of iron-containing silicon carbide fibers having a round cross section is repeatedly coated with a graphene oxide dispersion in N,N-dimethylformamide and dried. The process is repeated 13 times, to obtain silicon carbide fibers coated with graphene oxide on the surface. The thickness of the graphene oxide layer is 3 µm.

(2) The silicon carbide fibers coated with graphene oxide obtained in Step (1) are subjected to surface swelling in water, and then overlapped and dried to form a non-woven fabric, where the drying temperature is below 100° C.

(3) The graphene oxide crosslinked silicon carbide fibers obtained in Step (2) are placed in a closed vessel containing hydrazine hydrate and reduced at 80° C. for 12 hrs.

Through the above steps, graphene is coated on the surface of the silicon carbide fibers, and the surface of the silicon carbide fibers and the graphene sheet are connected by van der Waals force. The silicon carbide fibers are cross-linked by graphene coated on the surface, and the composite fibers are randomly overlapped to form a non-woven fabric structure. The areal density is 112.6 g/m², the breaking strength is 2.89 GPa, the electrical conductivity is $2.5 \times 10^4$ S/m, and the thermal conductivity is 23 W/mK.

Example 6-3

(1) The surface of titanium-containing silicon carbide fibers having a trilobal cross section is repeatedly coated with a graphene oxide dispersion in ethanol and dried. The process is repeated 16 times, to obtain silicon carbide fibers

TABLE 6

| Concentration of graphene oxide (mg/ml) | Thickness of graphene oxide layer (µm) | Areal density of composite fiber (g/m²) | Breaking strength (GPa) | Electrical conductivity (S/m) | Thermal conductivity (W/mK) |
|---|---|---|---|---|---|
| 0 | 0 | 108.3 | 2.81 | — | — |
| 0.1 | 0.5 | 109.6 | 2.83 | $4.6 \times 10^2$ | 16 |
| 1 | 1 | 111 | 2.87 | $1.1 \times 10^3$ | 19 |
| 7 | 3 | 116.6 | 2.91 | $2.8 \times 10^4$ | |
| 13 | 5.2 | 124.3 | 2.81 | $3.9 \times 10^3$ | 18 | coated with graphene oxide on the surface. The thickness of the graphene oxide layer is 3 μm.

(2) The silicon carbide fibers coated with graphene oxide obtained in Step (1) are subjected to surface swelling in water, and then overlapped and dried to form a non-woven fabric, where the drying temperature is below 100° C.

(3) The graphene oxide crosslinked silicon carbide fibers obtained in Step (2) are placed in a closed vessel containing hydroiodic acid and reduced at 90° C. for 18 hrs.

Through the above steps, graphene is coated on the surface of the silicon carbide fibers, and the surface of the silicon carbide fibers and the graphene sheet are connected by van der Waals force. The silicon carbide fibers are cross-linked by graphene coated on the surface, and the composite fibers are randomly overlapped to form a non-woven fabric structure. The areal density is 113.5 g/m², the breaking strength is 2.93 GPa, the electrical conductivity is $3.5 \times 10^4$ S/m, and the thermal conductivity is 24 W/mK.

Example 6-4

(1) The surface of silicon carbide fibers that are arranged in parallel and have a round cross section is repeatedly coated with a graphene oxide dispersion in ethylene glycol and dried. The process is repeated 12 times, to obtain silicon carbide filament fibers coated with graphene oxide on the surface. The thickness of the graphene oxide layer is 3 μm.

(2) The silicon carbide filament fibers coated with graphene oxide obtained in Step (1) are subjected to surface swelling in ethylene glycol, and then combined and dried to form a non-twisted yarn, where the drying temperature is below 100° C. to volatilize ethylene glycol.

(3) The graphene oxide crosslinked silicon carbide filament fibers obtained in Step (2) are placed in a closed vessel containing hydroiodic acid and reduced at 90° C. for 18 hrs.

Through the above steps, graphene is coated on the surface of the silicon carbide fibers, and the surface of the silicon carbide fibers and the graphene sheet are connected by van der Waals force. The silicon carbide fibers are cross-linked by graphene coated on the surface, and the composite fibers are arranged in parallel to form a non-twisted yarn structure. The breaking strength is 2.92 GPa, the electrical conductivity is $5.7 \times 10^4$ S/m, and the thermal conductivity is 27 W/mK.

Example 6-5

(1) The surface of hollow aluminum-containing silicon carbide fibers that are arranged in parallel is repeatedly coated with an aqueous graphene oxide dispersion and dried. The process is repeated 15 times, to obtain silicon carbide fibers coated with graphene oxide on the surface. The thickness of the graphene oxide layer is 3 μm.

(2) The silicon carbide fibers coated with graphene oxide obtained in Step (1) are subjected to surface swelling in ethylene glycol, and then combined and dried to form a non-twisted yarn, where the drying temperature is below 100° C. to volatilize ethylene glycol.

(3) The graphene oxide crosslinked silicon carbide filament fibers obtained in Step (2) are placed in a closed vessel containing hydroiodic acid and reduced at 90° C. for 18 hrs.

Through the above steps, graphene is coated on the surface of the silicon carbide fibers, and the surface of the silicon carbide fibers and the graphene sheet are connected by van der Waals force. The silicon carbide fibers are cross-linked by graphene coated on the surface, and the composite fibers are arranged in parallel to form a non-twisted yarn structure. The breaking strength is 2.86 GPa, the electrical conductivity is $4.8 \times 10^4$ S/m, and the thermal conductivity is 27 W/mK.

Example 7-1

(1) Basalt fibers are heated in toluene at 250° C., ultrasonically washed for 10-30 min to remove the sizing agent and oil on the surface, and dried.

(2) The surface of basalt fibers obtained in Step (1) is repeatedly coated with an aqueous graphene oxide dispersion and dried. The process is repeated 15 times, to obtain basalt fibers coated with graphene oxide on the surface. The thickness of the graphene oxide layer is 3 μm.

(3) The basalt fibers coated with graphene oxide obtained in Step (2) are subjected to surface swelling in water, and then overlapped and dried to form a non-woven fabric, where the drying temperature is below 100° C.

(4) The graphene oxide crosslinked basalt fibers obtained in Step (3) are placed in a closed vessel containing hydrazine hydrate and reduced at 80° C. for 12 hrs.

Through the above steps, graphene is coated on the surface of the basalt fibers, and the surface of the basalt fibers and the graphene sheet are connected by van der Waals force and hydrogen bonding. The basalt fibers are cross-linked by graphene coated on the surface, and the composite fibers are randomly overlapped to form a non-woven fabric structure. The areal density is 86.1 g/m², the breaking strength is 3.24 GPa, the strength retention rate is 89% after immersion for 6 hrs in alkali liquor at pH 12, the electrical conductivity is $1.6 \times 10^4$ S/m, and the thermal conductivity is 29 W/mK.

TABLE 7

| Concentration of graphene oxide (mg/ml) | Thickness of graphene oxide layer (μm) | Areal density of composite fiber (g/m²) | Breaking strength (GPa) | Retention rate after immersion for 6 hrs in alkali liquor at pH 12 (%) | Electrical conductivitvity (S/m) | Thermal conductivity (W/mK) |
|---|---|---|---|---|---|---|
| 0 | 0 | 81.3 | 3.12 | 52 | — | — |
| 0.1 | 0.5 | 82.4 | 3.17 | 78 | $6.3 \times 10^2$ | 19 |
| 1 | 1 | 83.6 | 3.21 | 83 | $1.1 \times 10^3$ | 24 |
| 7 | 3 | 86.1 | 3.24 | 89 | $1.6 \times 10^4$ | 29 |
| 13 | 5.2 | 89.3 | 3.16 | 91 | $7.3 \times 10^3$ | 21 |

In addition, the graphene oxide concentration and coating thickness are the optimum results obtained after repeated testes. It can be seen from Table 7 that with the same number of coatings, when the concentration of graphene oxide is 7 mg/ml, the thickness of the graphene oxide coating on the surface of the basalt fibers is 3 µm; the breaking strength, electrical conductivity, and thermal conductivity of the obtained basalt fiber non-woven fabric are the highest; and the cross-linking effect is optimum. As the concentration of graphene oxide declines, the thickness of graphene oxide on the surface of the basalt fibers decreases; the breaking strength, electrical conductivity, and thermal conductivity of the obtained basalt fiber non-woven fabric are lowered; and the cross-linking effect is deteriorated. As the concentration of graphene oxide rises, the thickness of graphene oxide on the surface of the basalt fibers increases, and distributed unevenly, and the degree of crosslinking decreases; and the breaking strength, electrical conductivity, and thermal conductivity of the obtained basalt fiber non-woven fabric are lowered.

Example 7-2

(1) Basalt fibers are heated in toluene at 250° C., ultrasonically washed for 10-30 min to remove the sizing agent and oil on the surface, and dried.

(2) The surface of basalt fibers obtained in Step (1) is repeatedly coated with a graphene oxide dispersion in N,N-dimethylformamide and dried. The process is repeated 13 times, to obtain basalt fibers coated with graphene oxide on the surface. The thickness of the graphene oxide layer is 3 µm.

(3) The basalt fibers coated with graphene oxide obtained in Step (2) are subjected to surface swelling in water, and then overlapped and dried to form a non-woven fabric, where the drying temperature is below 100° C.

(4) The graphene oxide crosslinked basalt fibers obtained in Step (3) are placed in a closed vessel containing hydrazine hydrate and reduced at 80° C. for 12 hrs.

Through the above steps, graphene is coated on the surface of the basalt fibers, and the surface of the basalt fibers and the graphene sheet are connected by van der Waals force and hydrogen bonding. The basalt fibers are cross-linked by graphene coated on the surface, and the composite fibers are randomly overlapped to form a non-woven fabric structure. The areal density is 85.2 g/m$^2$, the breaking strength is 3.21 GPa, the strength retention rate is 87% after immersion for 6 hrs in alkali liquor at pH 12, the electrical conductivity is $1.3 \times 10^4$ S/m, and the thermal conductivity is 28 W/mK.

Example 7-3

(1) Basalt fibers are heated in toluene at 250° C., ultrasonically washed for 10-30 min to remove the sizing agent and oil on the surface, and dried.

(2) The surface of basalt fibers obtained in Step (1) is repeatedly coated with a graphene oxide dispersion in ethanol and dried. The process is repeated 16 times, to obtain basalt fibers coated with graphene oxide on the surface. The thickness of the graphene oxide layer is 3 µm.

(3) The basalt fibers coated with graphene oxide obtained in Step (2) are subjected to surface swelling in water, and then overlapped and dried to form a non-woven fabric, where the drying temperature is below 100° C.

(4) The graphene oxide crosslinked basalt fibers obtained in Step (3) are placed in a closed vessel containing hydroiodic acid and reduced at 90° C. for 18 hrs.

Through the above steps, graphene is coated on the surface of the basalt fibers, and the surface of the basalt fibers and the graphene sheet are connected by van der Waals force and hydrogen bonding. The basalt fibers are cross-linked by graphene coated on the surface, and the composite fibers are randomly overlapped to form a non-woven fabric structure. The areal density is 84.6 g/m$^2$, the breaking strength is 3.23 GPa, the strength retention rate is 85% after immersion for 6 hrs in alkali liquor at pH 12, the electrical conductivity is $2.1 \times 10^4$ S/m, and the thermal conductivity is 27 W/mK.

Example 7-4

(1) Basalt filament fibers that are arranged in parallel are heated in toluene at 250° C., ultrasonically washed for 20 min to remove the sizing agent and oil on the surface, and dried.

(2) The surface of basalt fibers obtained in Step (1) is repeatedly coated with a graphene oxide dispersion in ethanol and dried. The process is repeated 12 times, to obtain basalt filament fibers coated with graphene oxide on the surface. The thickness of the graphene oxide layer is 3 µm.

(3) The basalt filament fibers coated with graphene oxide obtained in Step (2) are subjected to surface swelling in ethylene glycol, and then combined and dried to form a non-twisted yarn, where the drying temperature is below 100° C. to volatilize ethylene glycol.

(4) The graphene oxide crosslinked basalt filament fibers obtained in Step (3) are placed in a closed vessel containing hydroiodic acid and reduced at 90° C. for 18 hrs.

Through the above steps, graphene is coated on the surface of the basalt fibers, and the surface of the basalt fibers and the graphene sheet are connected by van der Waals force and hydrogen bonding. The basalt fibers are cross-linked by graphene coated on the surface, and the composite fibers are arranged in parallel to form a non-twisted yarn structure. The breaking strength is 3.42 GPa, the strength retention rate is 85% after immersion for 6 hrs in alkali liquor at pH 12, the electrical conductivity is $3.9 \times 10^4$ S/m, and the thermal conductivity is 31 W/mK.

Example 7-5

(1) Basalt filament fibers that are arranged in parallel are heated in toluene at 250° C., ultrasonically washed for 20 min to remove the sizing agent and oil on the surface, and dried.

(2) The surface of basalt fibers obtained in Step (1) is repeatedly coated with an aqueous graphene oxide dispersion and dried. The process is repeated 15 times, to obtain basalt fibers coated with graphene oxide on the surface. The thickness of the graphene oxide layer is 3 µm.

(3) The basalt fibers coated with graphene oxide obtained in Step (2) are subjected to surface swelling in ethylene glycol, and then combined and dried to form a non-twisted yarn, where the drying temperature is below 100° C. to volatilize ethylene glycol.

(4) The graphene oxide crosslinked basalt filament fibers obtained in Step (3) are placed in a closed vessel containing hydroiodic acid and reduced at 90° C. for 18 hrs.

Through the above steps, graphene is coated on the surface of the basalt fibers, and the surface of the basalt fibers and the graphene sheet are connected by van der Waals force and hydrogen bonding. The basalt fibers are crosslinked by graphene coated on the surface, and the composite fibers are arranged in parallel to form a non-twisted yarn structure. The breaking strength is 3.45 GPa, the strength retention rate is 84% after immersion for 6 hrs in alkali liquor at pH 12, the electrical conductivity is $4.4 \times 10^4$ S/m, and the thermal conductivity is 26 W/mK.

Example 8-1

(1) The surface of alumina fibers is repeatedly coated with an aqueous graphene oxide dispersion and dried. The process is repeated 15 times, to obtain alumina fibers coated with graphene oxide on the surface. The thickness of the graphene oxide layer is 3 µm.

(2) The alumina fibers coated with graphene oxide obtained in Step (3) are subjected to surface swelling in water, and then overlapped and dried to form a non-woven fabric, where the drying temperature is below 100° C.

(3) The graphene oxide crosslinked alumina fibers obtained in Step (2) are placed in a closed vessel containing hydrazine hydrate and reduced at 80° C. for 12 hrs.

Through the above steps, graphene is coated on the surface of the alumina fibers, and the surface of the alumina fibers and the graphene sheet are connected by van der Waals force and hydrogen bonding. The alumina fibers are crosslinked by graphene coated on the surface, and the composite fibers are randomly overlapped to form a non-woven fabric structure. The areal density is 96.5 g/m², the breaking strength is 2.23 GPa, the electrical conductivity is $3.7 \times 10^4$ S/m, and the thermal conductivity is 24 W/mK.

and dried. The process is repeated 13 times, to obtain alumina fibers coated with graphene oxide on the surface. The thickness of the graphene oxide layer is 3 µm.

(2) The alumina fibers coated with graphene oxide obtained in Step (1) are subjected to surface swelling in water, and then overlapped and dried to form a non-woven fabric, where the drying temperature is below 100° C.

(3) The graphene oxide crosslinked alumina fibers obtained in Step (2) are placed in a closed vessel containing hydrazine hydrate and reduced at 80° C. for 12 hrs.

Through the above steps, graphene is coated on the surface of the alumina fibers, and the surface of the alumina fibers and the graphene sheet are connected by van der Waals force and hydrogen bonding. The alumina fibers are crosslinked by graphene coated on the surface, and the composite fibers are randomly overlapped to form a non-woven fabric structure. The areal density is 95.6 g/m², the breaking strength is 2.3 GPa, the electrical conductivity is $4.5 \times 10^4$ S/m, and the thermal conductivity is 25 W/mK.

Example 8-3

(1) The surface of alumina fibers is repeatedly coated with a graphene oxide dispersion in ethanol and dried. The process is repeated 16 times, to obtain alumina fibers coated with graphene oxide on the surface. The thickness of the graphene oxide layer is 3 µm.

(2) The alumina fibers coated with graphene oxide obtained in Step (3) are subjected to surface swelling in water, and then overlapped and dried to form a non-woven fabric, where the drying temperature is below 100° C.

TABLE 8

| Concentration of graphene oxide (mg/ml) | Thickness of graphene oxide layer (µm) | Areal density of composite fiber (g/m²) | Breaking strength (GPa) | Electrical conductivity (S/m) | Thermal conductivity (W/mK) |
| --- | --- | --- | --- | --- | --- |
| 0 | 0 | 91.6 | 2.0 | — | — |
| 0.1 | 0.5 | 92.3 | 2.12 | $8.2 \times 10^2$ | 19 |
| 1 | 1 | 93.1 | 2.17 | $1.8 \times 10^3$ | 21 |
| 7 | 3 | 96.5 | 2.23 | $3.7 \times 10^4$ | 24 |
| 13 | 5.2 | 99.7 | 2.06 | $2.5 \times 10^3$ | 19 |

In addition, the graphene oxide concentration and coating thickness are the optimum results obtained after repeated testes. It can be seen from Table 8 that with the same number of coatings, when the concentration of graphene oxide is 7 mg/ml, the thickness of the graphene oxide coating on the surface of the alumina fibers is 3 µm; the breaking strength, electrical conductivity, and thermal conductivity of the obtained alumina fiber non-woven fabric are the highest; and the cross-linking effect is optimum. As the concentration of graphene oxide declines, the thickness of graphene oxide on the surface of the alumina fibers decreases; the breaking strength, electrical conductivity, and thermal conductivity of the obtained alumina fiber non-woven fabric are lowered; and the cross-linking effect and alkali resistance are deteriorated. As the concentration of graphene oxide rises, the thickness of graphene oxide on the surface of the alumina fibers increases, and distributed unevenly, and the degree of crosslinking decreases; and the breaking strength, electrical conductivity, and thermal conductivity of the obtained alumina fiber non-woven fabric are lowered.

Example 8-2

(1) The surface of alumina fibers is repeatedly coated with a graphene oxide dispersion in N,N-dimethyl formamide (3) The graphene oxide crosslinked alumina fibers obtained in Step (2) are placed in a closed vessel containing hydroiodic acid and reduced at 90° C. for 18 hrs.

Through the above steps, graphene is coated on the surface of the alumina fibers, and the surface of the alumina fibers and the graphene sheet are connected by van der Waals force and hydrogen bonding. The alumina fibers are crosslinked by graphene coated on the surface, and the composite fibers are randomly overlapped to form a non-woven fabric structure. The areal density is 95.7 g/m², the breaking strength is 2.24 GPa, the electrical conductivity is $4.1 \times 10^4$ S/m, and the thermal conductivity is 23 W/mK.

Example 8-4

(1) The surface of alumina fibers that are arranged in parallel is repeatedly coated with a graphene oxide dispersion in ethylene glycol and dried. The process is repeated 12 times, to obtain alumina filament fibers coated with graphene oxide on the surface. The thickness of the graphene oxide layer is 3 µm.

(2) The alumina filament fibers coated with graphene oxide obtained in Step (1) are subjected to surface swelling in ethylene glycol, and then combined and dried to form a non-twisted yarn, where the drying temperature is below 100° C. to volatilize ethylene glycol.

(3) The graphene oxide crosslinked alumina filament fibers obtained in Step (2) are placed in a closed vessel containing hydroiodic acid and reduced at 90° C. for 18 hrs.

Through the above steps, graphene is coated on the surface of the alumina fibers, and the surface of the alumina fibers and the graphene sheet are connected by van der Waals force and hydrogen bonding. The alumina fibers are cross-linked by graphene coated on the surface, and the composite fibers are arranged in parallel to form a non-twisted yarn structure. The breaking strength is 2.42 GPa, the electrical conductivity is $7.2 \times 10^4$ S/m, and the thermal conductivity is 27 W/mK.

Example 8-5

(1) The surface of alumina fibers that are arranged in parallel is repeatedly coated with an aqueous graphene oxide dispersion and dried. The process is repeated 15 times, to obtain alumina fibers coated with graphene oxide on the surface. The thickness of the graphene oxide layer is 3 μm.

(2) The alumina fibers coated with graphene oxide obtained in Step (1) are subjected to surface swelling in ethylene glycol, and then combined and dried to form a non-twisted yarn, where the drying temperature is below 100° C. to volatilize ethylene glycol.

(3) The graphene oxide crosslinked alumina filament fibers obtained in Step (2) are placed in a closed vessel containing hydroiodic acid and reduced at 90° C. for 18 hrs.

Through the above steps, graphene is coated on the surface of the alumina fibers, and the surface of the alumina fibers and the graphene sheet are connected by van der Waals force and hydrogen bonding. The alumina fibers are cross-linked by graphene coated on the surface, and the composite fibers are arranged in parallel to form a non-twisted yarn structure. The breaking strength is 2.52 GPa, the electrical conductivity is $7.6 \times 10^4$ S/m, and the thermal conductivity is 28 W/mK.

Example 9-1

(1) ultrasonically washing glass fibers in acetone to remove the oil on the surface, and drying;

(2) The surface of glass fibers obtained in Step (1) is repeatedly coated with an aqueous graphene oxide dispersion and dried. The process is repeated 15 times, to obtain glass fibers coated with graphene oxide on the surface. The thickness of the graphene oxide layer is 3 μm.

(3) The glass fibers coated with graphene oxide obtained in Step (2) are subjected to surface swelling in water, and then overlapped and dried to form a non-woven fabric, where the drying temperature is below 100° C.

(4) The graphene oxide crosslinked glass fibers obtained in Step (3) are placed in a closed vessel containing hydrazine hydrate and reduced at 80° C. for 12 hrs.

Through the above steps, graphene is coated on the surface of the glass fibers, and the surface of the glass fibers and the graphene sheet are connected by van der Waals force and hydrogen bonding. The glass fibers are cross-linked by graphene coated on the surface, and the composite fibers are randomly overlapped to form a non-woven fabric structure. The areal density is 92.4 g/m², the breaking strength is 134 N, the electrical conductivity is $6.5 \times 10^4$ S/m, and the thermal conductivity is 26 W/mK.

TABLE 9

| Concentration of graphene oxide (mg/ml) | Thickness of graphene oxide layer (μm) | Areal density of composite fiber (g/m²) | Breaking strength (N) | Electrical conductivity (S/m) | Thermal conductivity (W/mK) |
|---|---|---|---|---|---|
| 0 | 0 | 85.9 | 106 | — | — |
| 0.1 | 0.5 | 87.2 | 116 | $5.8 \times 10^2$ | 14 |
| 1 | 1 | 88.6 | 128 | $1.8 \times 10^3$ | 19 |
| 7 | 3 | 92.4 | 134 | $6.5 \times 10^4$ | 26 |
| 13 | 5.2 | 96.8 | 119 | $1.1 \times 10^3$ | 17 |

In addition, the graphene oxide concentration and coating thickness are the optimum results obtained after repeated testes. It can be seen from Table 9 that with the same number of coatings, when the concentration of graphene oxide is 7 mg/ml, the thickness of the graphene oxide coating on the surface of the glass fibers is 3 μm; the breaking strength, electrical conductivity, and thermal conductivity of the obtained glass fiber non-woven fabric are the highest; and the cross-linking effect is optimum. As the concentration of graphene oxide declines, the thickness of graphene oxide on the surface of the glass fibers decreases; the breaking strength, electrical conductivity, and thermal conductivity of the obtained glass fiber non-woven fabric are lowered; and the cross-linking effect is deteriorated. As the concentration of graphene oxide rises, the thickness of graphene oxide on the surface of the glass fibers increases, and distributed unevenly, and the degree of crosslinking decreases; and the breaking strength, electrical conductivity, and thermal conductivity of the obtained glass fiber non-woven fabric are lowered.

Example 9-2

(1) ultrasonically washing glass fibers in acetone to remove the oil on the surface, and drying;

(2) The surface of glass fibers obtained in Step (1) is repeatedly coated with a graphene oxide dispersion in N,N-dimethylformamide and dried. The process is repeated 13 times, to obtain glass fibers coated with graphene oxide on the surface. The thickness of the graphene oxide layer is 3 μm.

(3) The glass fibers coated with graphene oxide obtained in Step (2) are subjected to surface swelling in water, and then overlapped and dried to form a non-woven fabric, where the drying temperature is below 100° C.

(4) The graphene oxide crosslinked glass fibers obtained in Step (3) are placed in a closed vessel containing hydrazine hydrate and reduced at 80° C. for 12 hrs.

Through the above steps, graphene is coated on the surface of the glass fibers, and the surface of the glass fibers and the graphene sheet are connected by van der Waals force and hydrogen bonding. The glass fibers are cross-linked by graphene coated on the surface, and the composite fibers are randomly overlapped to form a non-woven fabric structure. The areal density is 93.1 g/m², the breaking strength is 136 N, the electrical conductivity is $6.1 \times 10^4$ S/m, and the thermal conductivity is 26 W/mK.

Example 9-3

(1) ultrasonically washing glass fibers in acetone to remove the oil on the surface, and drying;

(2) The surface of glass fibers obtained in Step (1) is repeatedly coated with a graphene oxide dispersion in ethanol and dried. The process is repeated 16 times, to obtain glass fibers coated with graphene oxide on the surface. The thickness of the graphene oxide layer is 3 μm.

(3) The glass fibers coated with graphene oxide obtained in Step (2) are subjected to surface swelling in water, and then overlapped and dried to form a non-woven fabric, where the drying temperature is below 100° C.

(4) The graphene oxide crosslinked glass fibers obtained in Step (3) are placed in a closed vessel containing hydroiodic acid and reduced at 90° C. for 18 hrs.

Through the above steps, graphene is coated on the surface of the glass fibers, and the surface of the glass fibers and the graphene sheet are connected by van der Waals force and hydrogen bonding. The glass fibers are cross-linked by graphene coated on the surface, and the composite fibers are randomly overlapped to form a non-woven fabric structure. The areal density is 94.6 g/m², the breaking strength is 139N, the electrical conductivity is $5.7 \times 10^4$ S/m, and the thermal conductivity is 23 W/mK.

Example 9-4

(1) Glass filament fibers that are arranged in parallel are ultrasonically washed in acetone to remove the oil on the surface, and dried.

(2) The surface of glass fibers obtained in Step (1) is repeatedly coated with a graphene oxide dispersion in ethylene glycol and dried. The process is repeated 12 times, to obtain glass filament fibers coated with graphene oxide on the surface. The thickness of the graphene oxide layer is 3 m.

(3) The glass filament fibers coated with graphene oxide obtained in Step (2) are subjected to surface swelling in ethylene glycol, and then combined and dried to form a non-twisted yarn, where the drying temperature is below 100° C. to volatilize ethylene glycol.

(4) The graphene oxide crosslinked glass filament fibers obtained in Step (3) are placed in a closed vessel containing hydroiodic acid and reduced at 90° C. for 18 hrs.

Through the above steps, graphene is coated on the surface of the glass fibers, and the surface of the glass fibers and the graphene sheet are connected by van der Waals force and hydrogen bonding. The glass fibers are cross-linked by graphene coated on the surface, and the composite fibers are arranged in parallel to form a non-twisted yarn structure. The breaking strength is 2.1 GPa, the electrical conductivity is $7.3 \times 10^4$ S/m, and the thermal conductivity is 27 W/mK.

Example 9-5

(1) Glass filament fibers that are arranged in parallel are ultrasonically washed in acetone to remove the oil on the surface, and dried.

(2) The surface of glass fibers obtained in Step (1) is repeatedly coated with an aqueous graphene oxide dispersion and dried. The process is repeated 15 times, to obtain glass fibers coated with graphene oxide on the surface. The thickness of the graphene oxide layer is 3 μm.

(3) The glass fibers coated with graphene oxide obtained in Step (2) are subjected to surface swelling in ethylene glycol, and then combined and dried to form a non-twisted yarn, where the drying temperature is below 100° C. to volatilize ethylene glycol.

(4) The graphene oxide crosslinked glass filament fibers obtained in Step (3) are placed in a closed vessel containing hydroiodic acid and reduced at 90° C. for 18 hrs.

Through the above steps, graphene is coated on the surface of the glass fibers, and the surface of the glass fibers and the graphene sheet are connected by van der Waals force and hydrogen bonding. The glass fibers are cross-linked by graphene coated on the surface, and the composite fibers are arranged in parallel to form a non-twisted yarn structure. The breaking strength is 2.17 GPa, the electrical conductivity is $5.9 \times 10^4$ S/m, and the thermal conductivity is 25 W/mK.

Example 10-1

(1) Graphene oxide having an average size greater than 50 μm is formulated into an aqueous graphene oxide solution having a concentration of 7 mg/mL. The graphene oxide solution is spread at a thickness of 5 mm by blade coating to form a film, which is naturally dried, to obtain a graphene oxide film.

(2) Two graphene oxide films having a size of 8 cm*8 cm are sprayed with a liquid and laminated. Specifically, a layer of aqueous graphene oxide solution having a concentration of 4 mg/mL is uniformly sprayed on the surface of the graphene oxide films, and then the graphene oxide films are bonded together in the thickness direction.

(3) The bonded graphene oxide composite film is dried in an oven at a temperature of 40° C.

(4) The dried graphene oxide composite film and the original graphene oxide film are respectively transferred to a hot-pressing chamber of a hot press, heated up to 200° C. at a ramping rate of 2° C./min, and then hot pressed by repeating the following hot pressing process 10 times: maintaining the pressure at 20 MPa for 1 hr, gradually releasing the pressure to 0 MPa, and evacuating the hot-pressing chamber for 5 min to a vacuum level of −50 KPa; then heated to 300° C. for 0.5 hr at a ramping rate of 2° C./min, and then hot pressed by repeating the following hot pressing process 5 times: maintaining the pressure at 60 MPa for 1 hr, gradually releasing the pressure to 0 MPa, and evacuating the hot-pressing chamber for 5 min to a vacuum level of −50 KPa; and naturally cooled after hot pressing.

(5) The film that is hot pressed in Step 4 is heated to a temperature of 2800° C. at a ramping rate of 5° C./min under an inert gas atmosphere and further hot pressed, where the temperature and pressure are held for 2 hrs; and the pressure is 60 MPa. After cooling, a graphene film with high thermal conductivity is obtained.

Through the above steps, the graphene oxide films are fused by the force at the bonded site to form an integrated structure. Through further low-temperature hot pressing and high temperature hot pressing, annealing, and reduction, a graphene composite film with high thermal conductivity is finally obtained. The graphene composite film bonded by coating the graphene oxide solution has fewer defects and more compact and complete structure because the graphene oxide therein can also fill the gaps. As tested, the thickness of the original graphene film is 26 μm, the pleat density on the graphene sheet is 92 mm/mm², and the graphene sheet has very few defects, and has an $I_D/I_G$ ratio of 0.004, a porosity of 8.6%, a density of 2.01 g/cm³, and an in-plane thermal conductivity of 1613.2 W/mK. After the above treatments, the thickness of the graphene composite film is 53 μm, the pleat density on the graphene sheet is 113 mm/mm², and the graphene sheet has very few defects, and has an ID/TG ratio of 0.005, a porosity of 9.0%, a density of 1.99 g/cm³, and an in-plane thermal conductivity of 1563.9 W/mK. There is no delamination in the thick graphene film, and the distance between any two adjacent graphene sheets is less than 20 nm.

Example 10-2

(1) Graphene oxide having an average size greater than 50 μm is formulated into an aqueous graphene oxide solution having a concentration of 7 mg/mL. The graphene oxide solution is spread at a thickness of 5 mm by blade coating to form a film, which is naturally dried, to obtain a graphene oxide film.

(2) Ten graphene oxide films having a size of 8 cm*8 cm are sprayed with different liquids and laminated. Specifically, the surface of the graphene oxide films is uniformly sprayed with deionized water to swell the surface, and then multiple graphene oxide films are bonded together in the thickness direction. The sample thus prepared is designated as Sample A. The surface of the graphene oxide films is uniformly coated with a layer of aqueous graphene oxide solution having a concentration of 4 mg/mL, and then multiple graphene oxide films are bonded together in the thickness direction. The sample thus prepared is designated as Sample B.

(3) The two bonded graphene oxide composite films are dried in an oven at a temperature of lower than 40° C.

(4) The dried graphene oxide composite films are transferred to a hot-pressing chamber of a hot press, heated to 200° C. at a ramping rate of 2° C./min, and then hot pressed by repeating the following hot pressing process 10 times: maintaining the pressure at 20 MPa for 1 hr, gradually releasing the pressure to 0 MPa, and evacuating the hot-pressing chamber for 5 min to a vacuum level of −50 KPa; then heated to 300° C. for 0.5 hr at a ramping rate of 2° C./min, and then hot pressed by repeating the following hot pressing process 5 times: maintaining the pressure at 60 MPa for 1 hr, gradually releasing the pressure to 0 MPa, and evacuating the hot-pressing chamber for 5 min to a vacuum level of −50 KPa; and naturally cooled after hot pressing.

(5) The graphene oxide composite film that is hot pressed in Step 4 is heated to a temperature of 2800° C. at a ramping rate of 5° C./min under an inert gas atmosphere, and further hot pressed, where the temperature and pressure are held for 2 hrs; and the pressure is 60 MPa. After cooling, a thick graphene film with high thermal conductivity is obtained.

Figure 7:
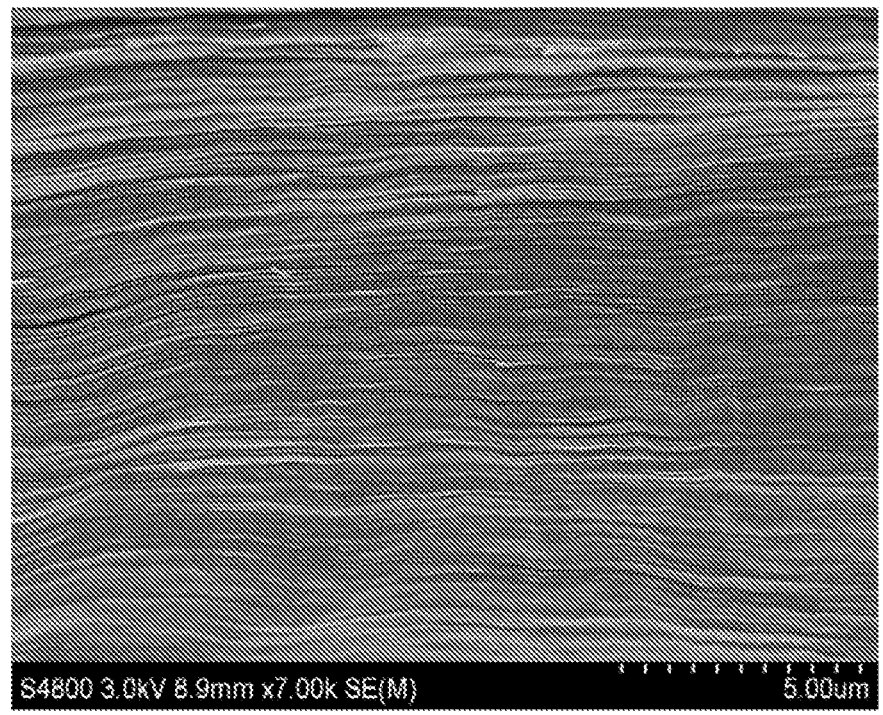
FIG. 7 is an SEM image at the cross section of a thick graphene film bonded with deionized water.
Figure 8:
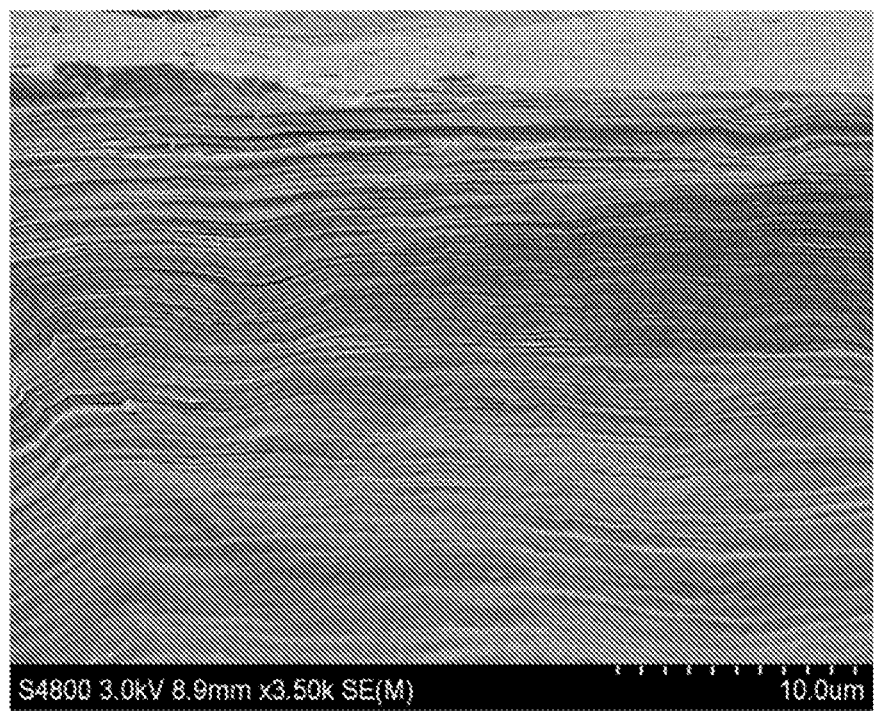
FIG. 8 is an SEM image at the cross section of a thick graphene film bonded with an aqueous graphene oxide solution.

Through the above steps, the graphene oxide films are fused by the force at the bonded site to form an integrated structure. Through further low-temperature hot pressing and high temperature hot pressing, annealing, and reduction, a thick graphene composite film with high thermal conductivity is finally obtained. The thick graphene composite film bonded by coating the graphene oxide solution has fewer defects and more compact and complete structure because the graphene oxide therein can also fill the gaps. As tested, the thickness of Sample A is 279 μm, the pleat density on the graphene sheet is 143 mm/mm², and the graphene sheet has very few defects, and has an $I_D/I_G$ ratio of 0.008, a porosity of 11.8%, and a density of 1.94 g/cm³. As shown in FIG. 7, there is no delamination in the thick graphene film, and the distance between any two adjacent graphene sheets is less than 20 nm. The thermal conductivity is 1448.9 W/mK. The thickness of Sample B is 291 μm, the pleat density on the graphene sheet is 134 mm/mm², and the graphene sheet has very few defects, and has an $I_D/I_G$ ratio of 0.007, a porosity of 11.4%, and a density of 1.95 g/cm³. As shown in FIG. 8, there is no delamination in the thick graphene film, and the distance between any two adjacent graphene sheets is less than 20 nm. The thermal conductivity is 1495.8 W/mK.

Example 10-3

(1) Graphene oxide with a high degree of oxidation and graphene oxide with a low degree of oxidation that have an average size of greater than 50 μm are respectively prepared into a 7 mg/mL aqueous graphene oxide solution, and spread at a thickness of 5 mm by blade coating to form a film, which is naturally dried, to obtain a graphene oxide film with a high degree of oxidation and a graphene oxide film with a low degree of oxidation.

(2) Ten graphene oxide films with a high degree of oxidation and ten graphene oxide films with a low degree of oxidation are respectively laminated, specifically by uniformly spraying deionized water on the surface of the graphene oxide film to swell the surface, and then bonding the plurality of graphene oxide films together in the thickness direction; The graphene oxide films can be self-bonded by the force at the bonding interface to obtain a graphene oxide composite film with a high degree of oxidation and a graphene oxide composite film with a low degree of oxidation, which are respectively designated as Sample C and Sample D.

(3) The two bonded graphene oxide composite film are dried in an oven at a temperature of lower than 40° C., where a pressure is gradually applied during the drying process.

(4) The dried graphene oxide composite films are transferred to a hot-pressing chamber of a hot press, heated to 200° C. at a ramping rate of 2° C./min, and then hot pressed by repeating the following hot pressing process 10 times: maintaining the pressure at 20 MPa for 1 hr, gradually releasing the pressure to 0 MPa, and evacuating the hot-pressing chamber for 5 min to a vacuum level of −50 KPa; then heated to 300° C. for 0.5 hr at a ramping rate of 2° C./min, and then hot pressed by repeating the following hot pressing process 5 times: maintaining the pressure at 60 MPa for 1 hr, gradually releasing the pressure to 0 MPa, and evacuating the hot-pressing chamber for 5 min to a vacuum level of −50 KPa; and naturally cooled after hot pressing.

(5) The graphene oxide composite film that is hot pressed in Step 4 is heated to a temperature of 2800° C. at a ramping rate of 5° C./min under an inert gas atmosphere, and further hot pressed, where the temperature and pressure are held for 2 hrs; and the pressure is 60 MPa. After cooling, a thick graphene film with high thermal conductivity is obtained.

Through the above steps, the graphene oxide films are fused by the force at the bonded site to form an integrated structure. Through further low-temperature hot pressing and high temperature hot pressing, annealing, and reduction, a thick graphene composite film with high thermal conductivity is finally obtained. Because the graphene oxide with high degree of oxidation has more functional groups, after the graphene oxide films with high degree of oxidation are bonded by evenly coating a layer of water, the hydrogen bonding and van der Waals forces at the interface are stronger, leading to a better bonding effect and a more compact structure. As tested, the thickness of Sample C is 261 μm, the pleat density on the graphene sheet is 151 mm/mm$^2$, and the graphene sheet has very few defects, and has an ID/TG ratio of 0.008, a porosity of 12.3%, a density of 1.93 g/cm$^3$, and an in-plane thermal conductivity of 1466.9 W/mK. There is no delamination in the thick graphene film, and the distance between any two adjacent graphene sheets is less than 20 nm. The thickness of Sample D is 255 μm, the pleat density on the graphene sheet is 139 mm/mm$^2$, and the graphene sheet has very few defects, and has an $I_D/I_G$ ratio of 0.09, a porosity of 13.2%, a density of 1.91 g/cm$^3$, and a thermal conductivity of 1418.7 W/mK. There is no delamination in the thick graphene film, and the distance between any two adjacent graphene sheets is less than 20 nm.

Example 10-4

(1) Graphene oxide having an average size greater than 50 μm is formulated into an aqueous graphene oxide solution having a concentration of 7 mg/mL. The graphene oxide solution is spread at a thickness of 5 mm and 2.5 mm respectively by blade coating to form films, which are naturally dried, to obtain two graphene oxide films having different thickness.

(2) Fiver thick graphene oxide films and ten thin graphene oxide films are respectively laminated. Specifically, a layer of aqueous graphene oxide solution having a concentration of 4 mg/mL is uniformly sprayed on the surface of the graphene oxide films, and then the graphene oxide films are bonded together in the thickness direction, to obtain two different graphene oxide composite films, which are designated as Sample E and Sample F respectively.

(3) The two bonded graphene oxide composite film are dried in an oven at a temperature of lower than 40° C., where a pressure is gradually applied during the drying process.

(4) The dried graphene oxide composite films are transferred to a hot-pressing chamber of a hot press, heated to 200° C. at a ramping rate of 2° C./min, and then hot pressed by repeating the following hot pressing process 10 times: maintaining the pressure at 20 MPa for 1 hr, gradually releasing the pressure to 0 MPa, and evacuating the hot-pressing chamber for 5 min to a vacuum level of −50 KPa; then heated to 300° C. for 0.5 hr at a ramping rate of 2° C./min, and then hot pressed by repeating the following hot pressing process 5 times: maintaining the pressure at 60 MPa for 1 hr, gradually releasing the pressure to 0 MPa, and evacuating the hot-pressing chamber for 5 min to a vacuum level of −50 KPa; and naturally cooled after hot pressing.

(5) The graphene oxide composite film that is hot pressed in Step 4 is heated to a temperature of 2800° C. at a ramping rate of 5° C./min under an inert gas atmosphere, and further hot pressed, where the temperature and pressure are held for 2 hrs; and the pressure is 60 MPa. After cooling, a thick graphene film with high thermal conductivity is obtained.

Through the above steps, the graphene oxide films are fused by the force at the bonded site to form an integrated structure. The defects are repaired through further low-temperature hot pressing and high temperature treatment, and thick graphene films with high thermal conductivity are finally obtained. As tested, the thickness of Sample E is 135 μm, the pleat density on the graphene sheet is 121 mm/mm$^2$, and the graphene sheet has very few defects, and has an $I_D/I_G$ ratio of 0.009, a porosity of 12.7%, a density of 1.92 g/cm$^3$, and a thermal conductivity of 1518.4 W/mK. There is no delamination in the thick graphene film, and the distance between any two adjacent graphene sheets is less than 20 nm. The thickness of the graphene composite film is 138 μm, the pleat density on the graphene sheet is 118 mm/mm$^2$, and the graphene sheet has very few defects, and has an $I_D/I_G$ ratio of 0.009, a porosity of 13.2%, a density of 1.91 g/cm$^3$, and a thermal conductivity of 1521.7 W/mK. There is no delamination in the thick graphene film, and the distance between any two adjacent graphene sheets is less than 20 nm.

Example 10-5

(1) Graphene oxide having an average size greater than 50 μm is formulated into an aqueous graphene oxide solution having a concentration of 7 mg/mL. The graphene oxide solution is spread at a thickness of 5 mm by blade coating to form a film, which is naturally dried, to obtain a graphene oxide film.

(2) 100 graphene oxide films having a size of 4 cm*4 cm are laminated. Specifically, a layer of aqueous graphene oxide solution having a concentration of 4 mg/mL is uniformly sprayed on the surface of the graphene oxide films, and then the graphene oxide films are bonded together in the thickness direction.

(3) The bonded graphene oxide composite film is dried in an oven at a temperature of lower than 40° C.

(4) The dried graphene oxide composite films are transferred to a hot-pressing chamber of a hot press, heated to 200° C. at a ramping rate of 2° C./min, and then hot pressed by repeating the following hot pressing process 10 times: maintaining the pressure at 20 MPa for 1 hr, gradually releasing the pressure to 0 MPa, and evacuating the hot-pressing chamber for 5 min to a vacuum level of −100-10 KPa; then heated to 300° C. for 0.5 hr at a ramping rate of 2° C./min, and then hot pressed by repeating the following hot pressing process 5 times: maintaining the pressure at 60 MPa for 1 hr, gradually releasing the pressure to 0 MPa, and evacuating the hot-pressing chamber for 5 min to a vacuum level of −100-10 KPa, and naturally cooled after hot pressing.

(5) The graphene oxide composite film that is hot pressed in Step 4 is heated to a temperature of 2500° C. at a ramping rate of 5° C./min under an inert gas atmosphere, and further hot pressed, where the temperature and pressure are held for 2 hrs; and the pressure is 60 MPa. After cooling, a thick graphene film with high thermal conductivity is obtained.

Through the above steps, the graphene oxide films are fused by the force at the bonded site and the graphene oxide in the coating solution fills the gaps to form an integrated structure. Through further low-temperature hot pressing and high temperature hot pressing, annealing, and reduction, a thick graphene composite film with high thermal conductivity is finally obtained. As tested, the thickness of the graphene film is 2.93 mm, the pleat density on the graphene sheet is 310 mm/mm$^2$, and the graphene sheet has very few defects, and has an $I_D/I_G$ ratio of 0.018, a porosity of 20.1%, a density of 1.74 g/cm$^3$, and a thermal conductivity of 1287.1 W/mK. There is no delamination in the thick graphene film, and the distance between any two adjacent graphene sheets is less than 20 nm.

Example 10-6

(1) Graphene oxide having an average size greater than 100 μm is formulated into an aqueous graphene oxide solution having a concentration of 1 mg/mL, and naturally dried after a film is formed from the solution, to obtain a graphene oxide film. The thickness of the graphene oxide film is 15 μm, and the carbon/oxygen ratio in the graphene oxide film is 1.8.

(2) A plurality of graphene oxide films is laminated specifically by uniformly spraying water on the surface of the graphene oxide film to swell the surface, and then bonding the plurality of graphene oxide films together in the thickness direction.

(3) The bonded graphene oxide composite film is dried in an oven at a temperature of 40° C.

(4) The dried graphene oxide composite film is transferred to a hot-pressing chamber of a hot press, heated to 200° C. at a ramping rate of 0.1° C./min, and then hot pressed by repeating the following hot pressing process 8 times: maintaining the pressure at 20 MPa for 1 hr, gradually releasing the pressure to 0 MPa, and evacuating the hot-pressing chamber for 5 min to a vacuum level of −100 KPa; then heated to 300° C. for 0.5 hr at a ramping rate of 0.1° C./min, and then hot pressed by repeating the following hot pressing process 4 times: maintaining the pressure at 60 MPa for 1 hr, gradually releasing the pressure to 0 MPa, and evacuating the hot-pressing chamber for 5 min to a vacuum level of −100 KPa; and naturally cooled after hot pressing.

(5) The graphene oxide composite film that is hot pressed in Step 4 is heated to a temperature of 1800° C. at a ramping rate of 1° C./min under an inert gas atmosphere, and further hot pressed, where the temperature and pressure are held for 8 hrs; and the pressure is 60 MPa. After pressing at a reduced temperature, a thick graphene film with high thermal conductivity is obtained.

As tested, the thickness of the prepared thick graphene film is 54 μm, the density is 2.1 g/cm³, the porosity is 5%, the thermal conductivity is 1987.1 W/mK, and the pleat density on the graphene sheet is 50 mm/mm²; and the graphene sheet has few detects, and has an $I_D/I_G$ ratio of 0.005. There is no delamination in the thick graphene film, and the distance between any two adjacent graphene sheets is less than 20 nm.

Example 10-7

(1) Graphene oxide having an average size greater than 50 μm is formulated into an aqueous graphene oxide solution having a concentration of 20 mg/mL, and naturally dried after a film is formed from the solution, to obtain a graphene oxide film having a thickness of 50 μm and a carbon/oxygen ratio of 2.1.

(2) A plurality of graphene oxide films is laminated specifically by uniformly spraying an aqueous graphene oxide solution having a concentration of 1 mg/mL on the surface of the graphene oxide film to swell the surface, and then bonding the plurality of graphene oxide films together in the thickness direction.

(3) The bonded graphene oxide composite film is dried in an oven at a temperature of 30° C.

(4) The dried graphene oxide composite film is transferred to a hot-pressing chamber of a hot press, heated to 200° C. at a ramping rate of 5° C./min, and then hot pressed by repeating the following hot pressing process 10 times: maintaining the pressure at 20 MPa for 1 hr, gradually releasing the pressure to 0 MPa, and evacuating the hot-pressing chamber for 5 min to a vacuum level of −10 KPa; then heated to 300° C. for 0.5 hr at a ramping rate of 5° C./min, and then hot pressed by repeating the following hot pressing process 6 times: maintaining the pressure at 60 MPa for 1 hr, gradually releasing the pressure to 0 MPa, and evacuating the hot-pressing chamber for 5 min to a vacuum level of −10 KPa; and naturally cooled after hot pressing.

(5) The graphene oxide composite film that is hot pressed in Step 4 is heated to a temperature of 3000° C. at a ramping rate of 20° C./min under an inert gas atmosphere, and further hot pressed, where the temperature and pressure are held for 0.5 hrs; and the pressure is 10 MPa. After pressing at a reduced temperature, a thick graphene film with high thermal conductivity is obtained.

As tested, the thickness of the prepared thick graphene film is 4.56 mm, the porosity is 40%, and the pleat density on the graphene sheet is about 500 mm/mm²; and the graphene sheet has few detects, and has an ID/TG ratio of 0.02. There is no delamination in the thick graphene film, and the distance between any two adjacent graphene sheets is less than 20 nm.

What is claimed is:

1. A method for preparing a highly thermally conductive thick graphene film, wherein the thickness is greater than 50 μm, the porosity is 5-40%, the in-plane thermal conductivity is 1000-2000 W/mK; the pleat density on the graphene sheet is controlled to 50-500 mm/mm2, and the graphene sheet has few defects and has an $I_D/I_G$ ratio of <0.02; there is no delamination in the graphene thick film, and the distance between any two adjacent graphene sheets is less than 20 nm; and the preparation method comprises the following steps:

(1) formulating graphene oxide having an average size greater than 50 μm into an aqueous graphene oxide solution having a concentration of 1 to 20 mg/mL, and naturally drying after a film is formed from the solution, to obtain a graphene oxide film;

(2) laminating a plurality of graphene oxide films specifically by uniformly spraying a liquid on the surface of the graphene oxide films to swell the surface, and then bonding the plurality of graphene oxide films together in the thickness direction;

(3) drying the bonded graphene oxide composite film in an oven at a temperature of not higher than 40° C.;

(4) transferring the dried graphene oxide composite film to a hot-pressing chamber of a hot press, heating to 200° C. at a ramping rate of 0.1 to l°C/min and then hot pressing by repeating the following hot-pressing process 8-10 times: maintaining the pressure at 20 MPa for 1 hr, gradually releasing the pressure to 0 MPa, and evacuating the hot-pressing chamber for 5 min to a vacuum level of −100-10 KPa; then heating to 300° C. for 0.5 hr at a ramping rate of 0.1-5° C./min, and then hot pressing by repeating the following hot pressing process 4-6 times: maintaining the pressure at 60 MPa for 1 hr, gradually releasing the pressure to 0 MPa, and evacuating the hot-pressing chamber for 5 min to a vacuum level of −100-10 KPa; and naturally cooling after hot pressing; and (5) heating the graphene oxide film that is hot pressed in Step 4 to a temperature of 1800-3000° C. at a ramping rate of 1-20° C./min under an inert gas atmosphere and further hot pressing, wherein the temperature and pressure are held for 0.5-8 hrs, and the pressure is 10 MPa; and pressing at a reduced temperature, to obtain a highly thermally conductive thick graphene film.

2. The method for preparing a highly thermally conductive thick graphene film according to claim 1, wherein the thickness of the graphene oxide film prepared in Step 1 is 1 to 30 μm.

3. The method for preparing a highly thermally conductive thick graphene film according to claim 1, wherein the film forming method in Step 1 is selected from suction filtration, blade coating, spin coating, spray coating, and dip coating.

4. The method for preparing a highly thermally conductive thick graphene film according to claim 1, wherein the carbon/oxygen ratio in the graphene oxide film prepared in Step 1 is ranged from 1.8:1 to 2.1:1.

5. The method for preparing a highly thermally conductive thick graphene film according to claim 1, wherein the liquid for spraying in Step 2 is deionized water, a graphene oxide aqueous solution having a concentration of 1 to 10 mg/mL, or other solutions containing deionized water.

\* \* \* \* \*